United States Patent
Matsumoto

(10) Patent No.: US 8,224,477 B2
(45) Date of Patent: Jul. 17, 2012

(54) WORK MACHINING APPARATUS CONTROL PROGRAM AND WORK MACHINING APPARATUS CONTROL DEVICE FOR EXECUTING THE CONTROL PROGRAM

(75) Inventor: Hitoshi Matsumoto, Kitasaku-gun (JP)

(73) Assignee: Citizen Holdings Co., Ltd., Tokyo (JP)

( * ) Notice: Subject to any disclaimer, the term of this patent is extended or adjusted under 35 U.S.C. 154(b) by 585 days.

(21) Appl. No.: 12/309,610

(22) PCT Filed: Aug. 1, 2007

(86) PCT No.: PCT/JP2007/065041
§ 371 (c)(1),
(2), (4) Date: Jan. 23, 2009

(87) PCT Pub. No.: WO2008/016068
PCT Pub. Date: Feb. 7, 2008

(65) Prior Publication Data
US 2009/0198367 A1   Aug. 6, 2009

(30) Foreign Application Priority Data

Aug. 4, 2006 (JP) ................................. 2006-213819
Oct. 26, 2006 (JP) ................................. 2006-291592

(51) Int. Cl.
*G06F 19/00* (2006.01)
(52) U.S. Cl. ........ 700/160; 700/159; 700/169; 700/174; 700/177; 700/178; 700/179; 700/182; 700/186; 700/192
(58) Field of Classification Search .......... 700/177–179, 700/192, 159–160, 169, 174, 182, 186
See application file for complete search history.

(56) References Cited

U.S. PATENT DOCUMENTS 5,031,106 A * 7/1991 Tanahashi et al. ............ 700/186
5,127,140 A * 7/1992 Oiwa et al. ..................... 29/27 C
(Continued)

FOREIGN PATENT DOCUMENTS

DE           43 10 038 A1     9/1994
(Continued)

OTHER PUBLICATIONS

Translation of JP 06-155103 A; created using Japan Patent Office website; printed from Internet on Nov. 29, 2011; 32 pages.*

*Primary Examiner* — Ronald Hartman, Jr.
(74) *Attorney, Agent, or Firm* — Manabu Kanesaka

(57) ABSTRACT

A control system is provided for each pair of a work fixing part and a work machining part. In each control system, a work receiving program block, a work machining program block and a work discharge program block are provided, and the work machining program block starts on the condition that the work receiving program block ends and the work discharge block program starts on the condition that the work machining program block ends. The work receiving program block is associated with the work supply program of the work supply apparatus, or the work discharge program block is associated with a work transfer program of a work transfer apparatus so that a command is issued to the work receiving program block or the work discharge program block, and a command to perform a cue of the head of the program of each control system is provided at the last part of the control system.

17 Claims, 16 Drawing Sheets

U.S. PATENT DOCUMENTS

| | | | |
|---|---|---|---|
| 5,170,358 A * | 12/1992 | Delio | 700/177 |
| 5,243,534 A * | 9/1993 | Takahashi | 700/179 |
| 5,436,845 A * | 7/1995 | Takahashi | 700/179 |
| 5,526,725 A | 6/1996 | Tremaglio et al. | 82/1.11 |
| 5,535,652 A * | 7/1996 | Beck et al. | 82/118 |
| 5,933,353 A * | 8/1999 | Abriam et al. | 700/182 |
| 6,671,571 B1 * | 12/2003 | Matsumiya et al. | 700/172 |
| 6,819,974 B1 * | 11/2004 | Coleman et al. | 700/195 |
| 6,856,854 B2 * | 2/2005 | Endo et al. | 700/186 |
| 7,774,088 B2 * | 8/2010 | Yamada | 700/169 |
| 2003/0204287 A1 * | 10/2003 | Shirakawa et al. | 700/193 |
| 2004/0153199 A1 * | 8/2004 | Sagasaki et al. | 700/169 |
| 2005/0038552 A1 * | 2/2005 | Sagawa et al. | 700/181 |
| 2005/0119781 A1 * | 6/2005 | Collins | 700/175 |
| 2006/0253220 A1 * | 11/2006 | McPherson et al. | 700/176 |
| 2007/0088455 A1 * | 4/2007 | Fraunhofer | 700/173 |
| 2008/0288102 A1 * | 11/2008 | Conen | 700/186 |
| 2010/0269327 A1 * | 10/2010 | Gray | 29/592 |

FOREIGN PATENT DOCUMENTS

| | | |
|---|---|---|
| JP | S61-214947 | 9/1986 |
| JP | H04-025351 | 1/1992 |
| JP | H06-155103 | 6/1994 |
| JP | H10-143229 | 5/1998 |
| JP | 2002-28801 | 1/2002 |
| JP | 2003-117701 | 4/2003 |

* cited by examiner (a)

(b)

WORK MACHINING APPARATUS CONTROL PROGRAM AND WORK MACHINING APPARATUS CONTROL DEVICE FOR EXECUTING THE CONTROL PROGRAM

TECHNICAL FIELD

The invention relates to a control program to be incorporated in a control device for a work machining apparatus such as an NC lathe, as well as to a control device for a work machining apparatus for executing the control program.

BACKGROUND ART

If a work is machined by a plurality of steps, by using a work machining apparatus such as a machining tool provided with a plurality of main spindles and tool rests, the work is machined in a sequential manner while being transferred between the main spindles.

For example, Patent Document 1 discloses a work machining apparatus in which two opposing headstocks 24 and 26 which are movable in the X direction are provided, and an unmachined work 46, which is held by rotatable main spindles 28 and 30 respectively provided on the headstocks 24 and 26, is machined by tools 36 and 38 which are mounted on turret tool rests 32 and 34 provided corresponding to the headstocks 24 and 26.

In addition, by the movement in the Z direction, the two headstocks 24 and 26 are made get closer to each other, and the work is delivered from one of the main spindles (the main spindle 28) to the other main spindle 30.

As for the supply of the unmachined work 46, the unmachined work 46 is directly supplied to the main spindle 28 from a work stocker 44 provided at one end of a bed 10. Discharge of the machined work 52 from the main spindle 30 is performed by a work discharge apparatus 50 provided at one end of the bed 10 such that it opposes to the work stocker 44.

Patent Document 1: DE-A-4310038 (see the drawings)

However, in the case of a work machining apparatus similar to that mentioned above, which is provided with a plurality of main spindles and a plurality of tool rests which machines a work while transferring the work between the main spindles, the NC program becomes a multi-system program corresponding to the number of the main spindle, and control of the main spindle and the corresponding tool rest is performed in each system. In this case, normally, the NC programs in these systems are started simultaneously and rewound simultaneously when machining is completed.

Such a control method has the following problem. Specifically, a series of machining programs is prepared for each system, and supply, machining and discharge of a work are controlled by this machining program. Therefore, when machining of the first work is initiated by starting the work machining apparatus, since the second and subsequent main spindles move for machining in spite of the absence of a work to be machined, air cut is caused, resulting in wasteful consumption of power or the like. Such a problem occurs also at the time of the completion of machining of the last work.

This problem can be eliminated by, for example, creating a subprogram by which the number of works to be machined is counted and, based on the counted number of works, a standby command is issued to predetermined main spindles in order to avoid air cut. However, preparation of such an exclusive subprogram in addition to the original machining program makes creation of an entire machining program troublesome.

The invention has been made in view of the above-mentioned problem, and the object thereof is to provide a control program which can eliminate a wasteful movement such as air cut when a work is machined by using a multi-spindle NC lathe or the like, and can perform supply and discharge of a work without an exclusive program, as well as to provide a control device for a work machining apparatus which executes this control program.

DISCLOSURE OF THE INVENTION

In order to solve the above-mentioned problem, the control program of the invention is a control program for controlling a work machining apparatus provided with a plurality of work fixing parts, and performs machining of a work which has been fixed to the work fixing part in a work machining part provided corresponding to the work fixing part while transferring the work between these work fixing parts, wherein a control system is provided for each pair of the work fixing part and the work machining part, each control system has a work receiving program block which controls the movement of a movable body comprising the working fixing part and the work machining part when an unmachined work is received, a work machining program block which controls the movement of a movable body comprising the work fixing part and the work machining part when a work which has been fixed to the work fixing part is machined in the work machining part, and a work discharge program block which controls the movement of a movable body comprising the work fixing part and the work machining part when the work which has been machined is discharged, the work machining program block starts on the condition that the work receiving program block ends and the work discharge block program starts on the condition that the work machining program block ends, the work receiving program block is associated with the work supply program of the work supply apparatus, or the work discharge program block is associated with a work transfer program of a work transfer apparatus so that a command is issued to the work receiving program block or the work discharge program block to perform queuing and cooperation operations which are necessary when transferring a work between the work supply apparatus or the work transfer apparatus, and a command to perform a cue of the head of the program of each control system is issued at the last part of the control system. In this case, it is preferred that, in the work receiving program block, the work machining program block and the work discharge program block, a command be provided so that execution of the program ends when the number of machined works reaches a predetermined number.

According to this control program, machining of a work is not performed until supply of a work is completed, whereby air cut caused by idle machining can be prevented. In addition, at the time of work supply, wasteful air cut can be prevented since the control program remains in the standby state until the work supply part is prepared to supply.

Furthermore, at the time of discharging a work, a work is not discharged until machining of a work is completed, and the control program remains in the standby state until the work discharge part is prepared to discharge, whereby wasteful air cut can be prevented.

In addition, since receiving and discharge of a work can be performed without using an exclusive program, the configuration of the control program can be simplified and the creation of the program can be facilitated.

The control program of the invention can be used when a plurality of similar work machining apparatuses are combined to form a work machining system.

In this case, the work supply program of the work supply apparatus is the work discharge program block of the work fixing part and the work machining part which perform the last machining in the work machining apparatus provided in an upstream step, and the work transfer program of the work transfer apparatus is the work receiving program block of the work fixing part and the work machining part which perform the first machining in the work machining apparatus provided in a downstream step.

The work machining apparatus may be a machining tool or various assembling machines insofar as it performs machining (including assembling) of a work. For example, the work machining apparatus may be an NC lathe. Specifically, it may be a tri-axial NC lathe in which the work fixing part comprises a first main spindle which receives an unmachined work from the work supplying apparatus, a third main spindle which is arranged in parallel with the first main spindle such that it faces the same direction as the first main spindle and a second main spindle which is arranged opposing to the first main spindle, is allowed to move freely back and forth between a position on the axial line of the first main spindle and a position on the axial line of the third main spindle, and receives a work from the first main spindle and transfers the work to the third main spindle by the back-and-forth movement along the axial line of the first main spindle or the axial line of the third main spindle, and the work machining part comprises a first tool rest provided corresponding to the first main spindle, a second tool rest provided corresponding to the second main spindle and a third tool rest provided corresponding to the third main spindle.

In an NC lathe with such a configuration, machining is performed while a work is directly transferred from one main spindle to another main spindle in the order of the first main spindle to the second main spindle and then to the third main spindle.

If a plurality of work machining apparatuses are connected or a plurality of work fixing parts and a plurality of work machining parts are provided in a single work machining apparatus, a plurality of control systems are provided corresponding to each pair of a work fixing part and a work machining part. Since the plurality of control systems are independent from each other, during the execution of a program in one control system, if an abnormality such as tool breakage, erroneous work supply and erroneous program execution occurs in other control systems, the program is executed in the above-mentioned one control system, whereby supply, machining or discharge of a work are performed.

When the above-mentioned one control system cooperating with the above-mentioned other control systems which encounters an abnormality, execution of the program in the above-mentioned one control system temporarily stops for the first time. An operator who notices the abnormality can manually stop execution of a program in the above-mentioned one control system. However, if execution of a program is forced to stop during machining of a work, the work may get a scratch, resulting in formation of defective products.

Therefore, in the invention, a program block may be provided in at least one of the plurality of control systems which are independent from each other. The program block judges whether there is any abnormality in the other control systems, and if any abnormality is judged to exist, it temporarily stops initiation of work machining or temporarily stops execution of the program of the control system after work machining is completed.

By providing such a program block, if an abnormality occurs in the above-mentioned other control systems, execution of the program stops before the start of work machining or immediately after completion of work machining in the above-mentioned one control system, and an operator may be urged to eliminate the abnormality in the above-mentioned other control systems.

Control of each movable body of the work machining apparatus can be performed by means of a control device in which the above-mentioned control program is installed, which issues, by executing the installed control program, a command to control movement of the above-mentioned movable body comprising the work fixing part and the work machining part.

Since the control program of the invention has the above-mentioned configuration, it is free of wasteful motions such as air cut, and does not require another exclusive program for the supply and discharge of a work.

Therefore, it is possible to obtain a control program and a control device for a work machining apparatus which can save both energy and cost.

BEST MODE FOR CARRYING OUT THE INVENTION

A preferred embodiment of the invention will be described below in detail with reference to the drawings.

[Outline of Work Machining Apparatus]

Figure 1:
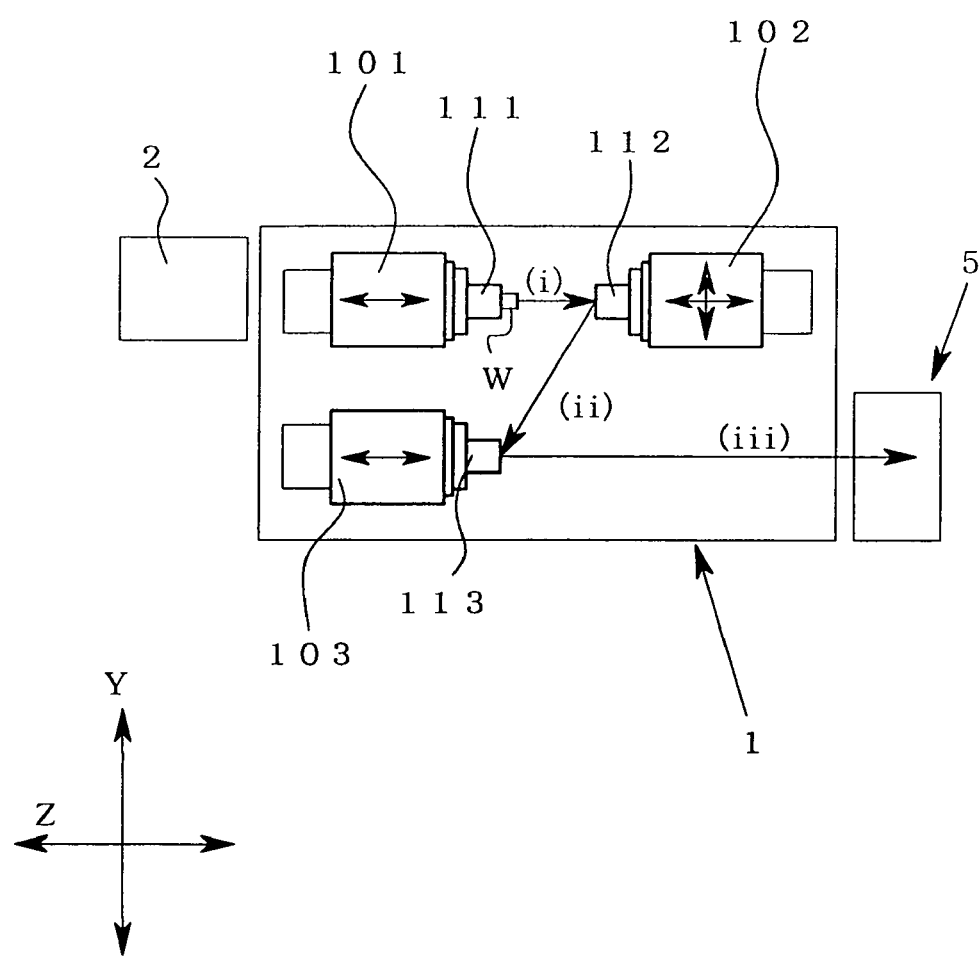
FIG. 1 is a schematic view for explaining the configuration of one example of an NC lathe as the work machining apparatus to which the control program of the invention is applied.

FIG. 1 is a schematic view for explaining the configuration of one example of the work machining apparatus to which the control program of the invention is applied.

The work machining apparatus of this embodiment is a tri-axial NC lathe (hereinafter referred to as an NC lathe) 1 having three main spindles 111, 112 and 113.

The NC lathe 1 has a first headstock 101 which can move back and forth in the Z direction and a cylindrical first main spindle 111 as a first main spindle which is rotatably supported by this first headstock 101, a third headstock 103 which is arranged in parallel with the first headstock 101 and can move back and forth in the Z direction and a third main spindle 113 as a third main spindle which is rotatably supported by this third headstock 103, and a second headstock 102 which is arranged opposing to the first headstock 101 and can move back and forth in the Z direction between a position opposing to the first headstock 101 and a position opposing to the third headstock 103 and a second main spindle 112 as a second main spindle which is rotatably supported by this second headstock 102.

In this NC lathe 1, as shown by numerals (i), (ii) and (iii) in the figure, a work W which has been supplied from a bar feeder 2, which is a work supply apparatus, is machined, with the work being sequentially transferred from the first main spindle 111, the second main spindle 112 and the third main spindle 113. The work W which has been machined is discharged outside by means of a work transfer apparatus 5 such as a loader.

Although not shown in FIG. 1, in the NC lathe 1, at least three tool rests are provided respectively corresponding to the first main spindle 111, the second main spindle 112 and the third main spindle 113. By using tools mounted on these three tool rests, machining of the work W held by the chuck of the first main spindle 111, the second main spindle 112 and the third main spindle 113 can be performed simultaneously.

[Specific Configuration of NC Lathe]

Figure 2:
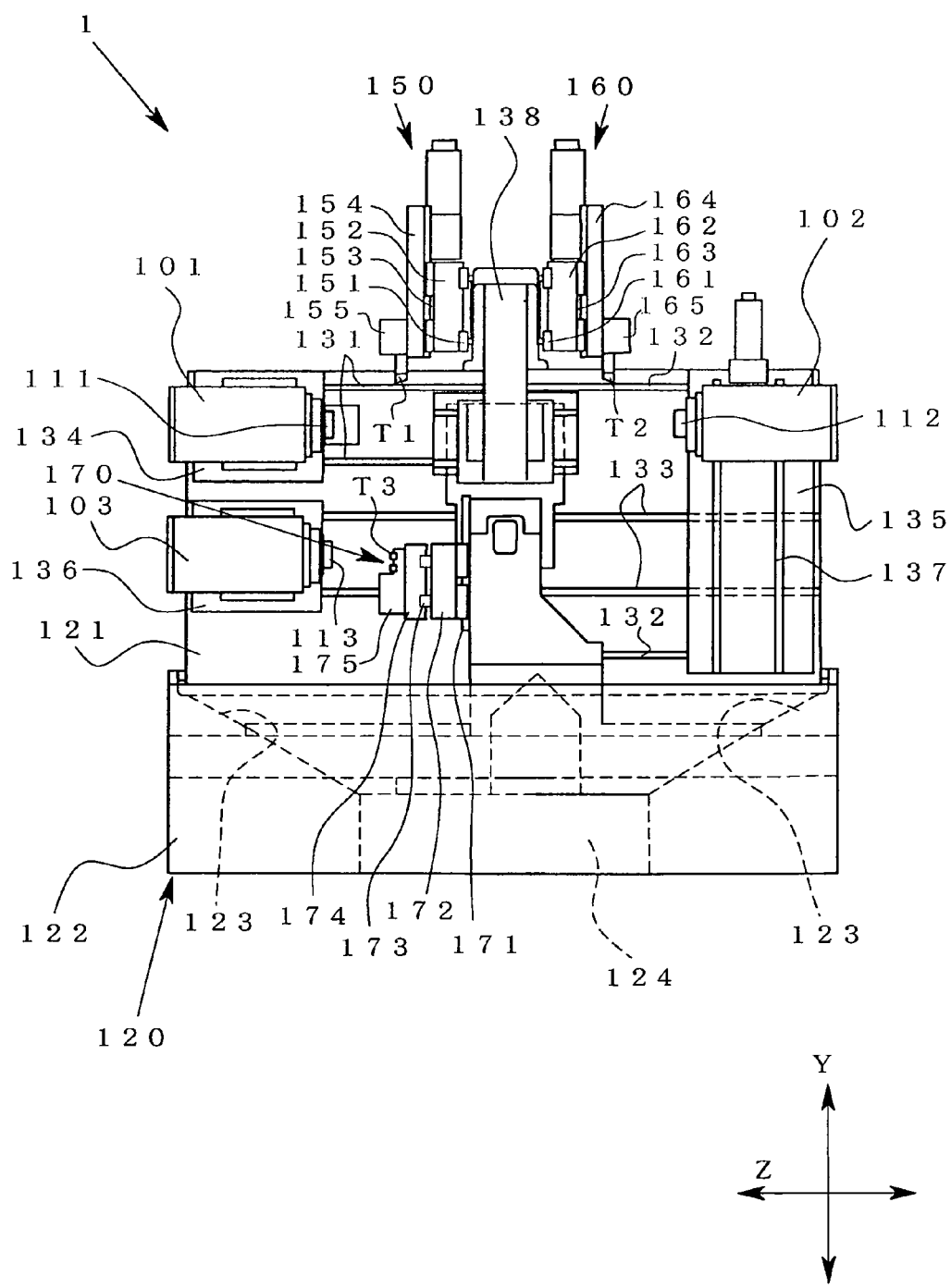
FIG. 2 is a front view of the NC lathe shown in FIG. 1 for explaining in more detail the structure of the NC lathe shown in FIG. 1.
Figure 3:
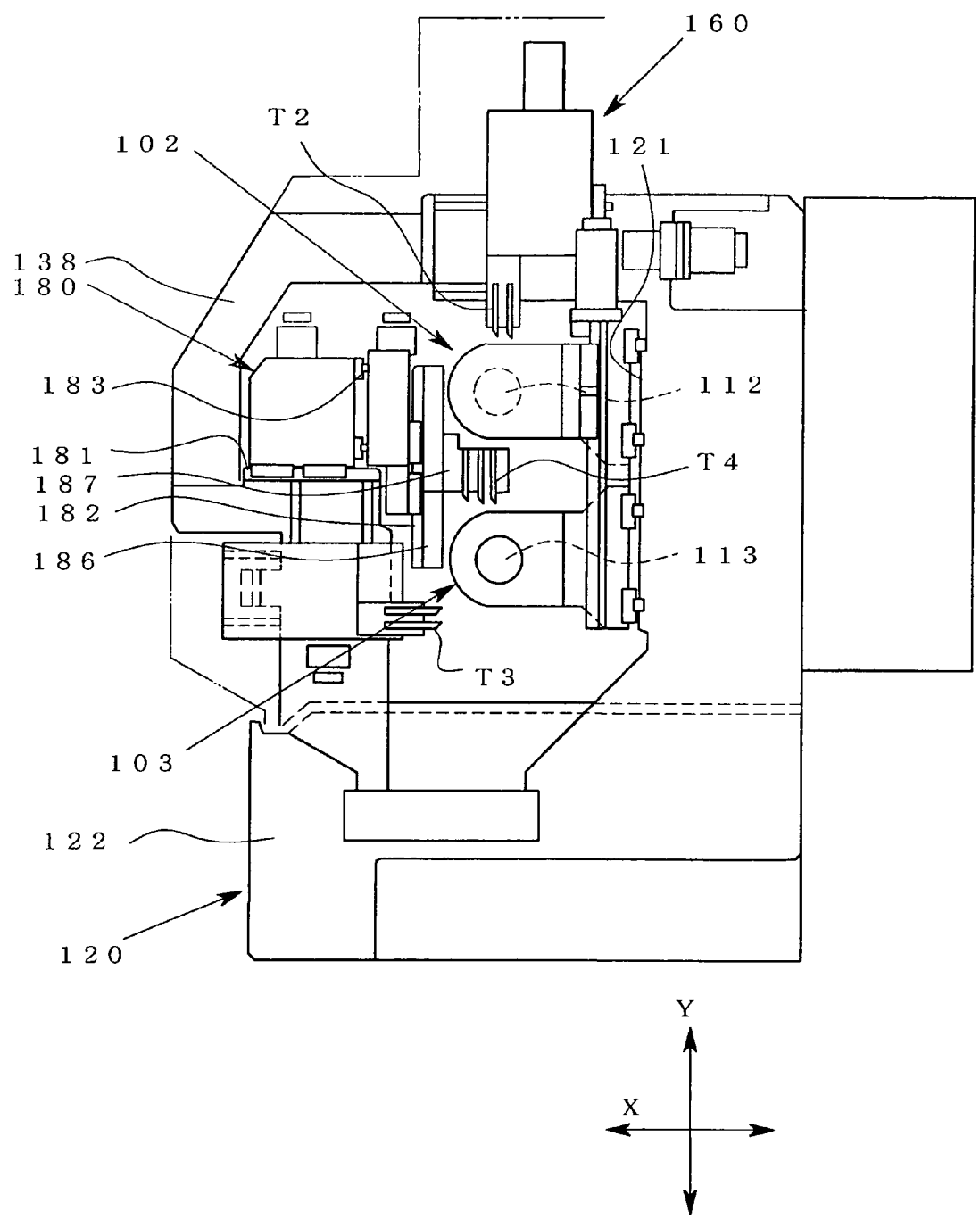
FIG. 3 is a right side view of the NC lathe shown in FIG. 2.

FIG. 2 is a view for explaining the specific configuration of the above-mentioned NC lathe 1, which is a front view of the NC lathe. FIG. 3 is a side view of the NC lathe 1 shown in FIG. 2.

The three headstocks 101, 102 and 103 are provided such that they can freely move back and forth in the Z direction on a ZY surface 121 of a bed 120 which is formed in an approximate inverted L shape, as viewed from the side. Specifically, on the ZY surface 121, three sets of guiderails 131, 132 and 133 are laid in the Z direction. The first headstock 101 is provided in a saddle 134 which moves back and forth in the Z direction by the guidance of the guiderail 131, the second headstock 102 is provided in a saddle 135 which moves back and forth in the Z direction by the guidance of the guiderail 132 and the third headstock 103 is provided in a saddle 136 which moves back and forth in the Z direction by the guidance of the saddle 136 which moves back and forth in the Z direction by the guidance of the guiderail 133.

The saddle 135 is formed in a rectangular shape as viewed from the front, having the longer side thereof in the Y direction. A guiderail 137 is laid on the surface thereof in the Y direction. The second headstock 102 can move freely back and forth also in the Y direction by the guidance of the guiderail 137.

The guiderail 133 which guides the movement in the Z direction of the third headstock 103 extends to the other end (upper right end in FIG. 2) of the ZY surface 121 and can move the work W held by the chuck at the front end of the third main spindle 113 to a position where the work can be delivered to the adjacent work transfer apparatus 5.

During the move of the third headstock 103 to the other end, care must be taken so that interference of the third headstock 103 and the saddle 136 with the saddle 136 of the second headstock 102 can be avoided.

Figure 4:
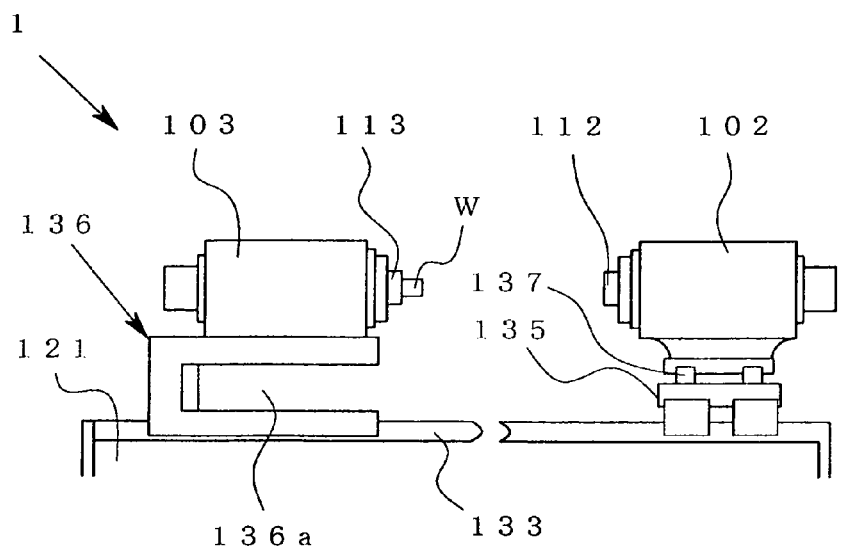
FIG. 4 is a view showing one example of a configuration for preventing interference of the third headstock and the saddle thereof with the saddle on the second headstock.
Figure 4:
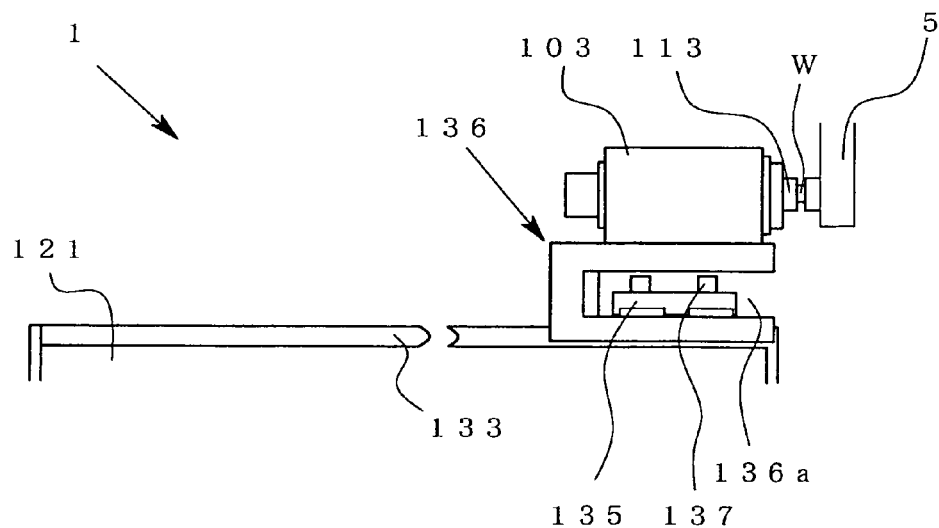

FIG. 4 is a view showing one example of a configuration for avoiding the above-mentioned interference.

As shown in FIG. 4(a), the saddle 136 on which the third headstock 103 is mounted, a concave part 136a is formed to avoid the interference with the saddle 135 of the second headstock 102.

When the third headstock 103 moves to the other end of the ZY surface 121 where the work W is delivered from the third main spindle 113 of the NC lathe 1 to the work transfer apparatus 5 such as a loader, as shown in FIG. 4(b), the saddle 135 and the guiderail 137 enter the inside of the concave part 136a, whereby the interference of the saddle 136 and the saddle 135 can be prevented.

As shown in FIGS. 2 and 3, from the front middle of a base 122 of the bed 120 to the upper middle of the ZY surface 121, a portal tool rest support 138 is provided. This tool rest support 138 is provided with a first tool rest 150 having a plurality of tools T1 for machining the work W held by the chuck of the first main spindle 111, a second tool rest 160 having a plurality of tools T2 for machining the work W held by the chuck of the second main spindle 112 and a third tool rest 170 having a plurality of tools T3 for machining the work W held by the chuck of the third main spindle 113.

The first tool rest 150 is provided above the tool rest support 138 facing the first headstock 101, and has a guide 151 laid in the X direction, a saddle 152 which moves back and forth in the X direction by the guidance of this guide 151, a guiderail 153 which is laid in the Y direction on one surface of the saddle 152 and a tool rest body 154 which moves back and forth in the Y direction by the guidance of this guiderail 153.

The plurality of tools T1 are mounted in a tool mounting part 155 of the tool rest body 154 in such a manner that they are arranged like teeth in a comb. A predetermined tool T1 is allocated to the machining position by the move of the saddle 152 in the X direction. Machining of the work W by the tool T1 is performed by the move of the tool rest body 154 in the Y direction and the move of the first headstock 101 in the Z direction.

The second tool rest 160 is provided above the tool rest support 138 facing the second headstock 102, and has a guide 161 laid in the X direction, a saddle 162 which moves back and forth in the X direction by the guidance of this guide 161, a guiderail 163 which is laid in the Y direction on one surface of the saddle 162 and a tool rest body 164 which moves back and forth in the Y direction by the guidance of this guiderail 163.

The plurality of tools T2 are mounted in a tool mounting part 165 of the tool rest body 164 in such a manner that they are arranged like teeth in a comb. A predetermined tool T2 is allocated to the machining position by the move of the saddle 162 in the X direction. Machining of the work W by the tool T2 is performed by the move of the tool rest body 164 in the Y direction and the move of the second headstock 102 in the Z direction.

The third tool rest 170 is provided under the tool rest support 138 facing the third headstock 103, and has a guide 171 laid in the Y direction, a saddle 172 which moves back and forth in the Y direction by the guidance of this guide 171, a guiderail 173 which is laid in the Y direction on one surface of the saddle 172 and a tool rest body 174 which moves back and forth in the Y direction by the guidance of this guiderail 173.

The plurality of tools T3 are mounted in a tool mounting part 175 of the tool rest body 174 in such a manner that they are arranged like teeth in a comb. A predetermined tool T3 is allocated to the machining position by the move of the saddle 172 in the X direction. Machining of the work W by the tool T3 is performed by the move of the tool rest body 174 in the Y direction and the move of the third headstock 103 in the Z direction.

In this embodiment, above the third tool rest 170 in the tool rest support 138, a fourth tool rest 180 is provided to machine the work W held by the chuck of the second main spindle 112 or the third main spindle 113.

In this fourth tool rest 180, in a tool installation part 187 of a tool rest body 186 which can move freely back and forth in three axial directions of X, Y and Z by an X-direction guiderail 181, a Y-direction guiderail 182 and a Z-direction guiderail 183, a plurality of tools T4 are arranged in the X direction. Due to the move of the tool rest body 186 in the X direction, the tool T4 is allocated to the machining position. Machining of the work W by the tool T4 is performed by the move of the second headstock 102 or the third headstock 103 in the Z direction and the move of the tool rest body 186 in the Y direction.

Due to the move of the tool rest body 186 in the Z direction, machining of the work W can be performed by the tool T4 simultaneously with machining by the tool T2 or the tool T3, without the fear of interference of the tool T4 with other tools (tool T2 or tool T3) of other tool rests (second tool rest 160 or third tool rest 170).

As examples of the above-mentioned tools T1 to T4, in addition to cutting tools such as tool bites, rotary tools such as drills and taps can also be used.

The base 122 of the bed 120 is provided with, at the front and the back thereof, an inclined surface 123 for collecting cut scraps and coolants formed and used in machining the work W by means of the tools T1 to T4. The cut scraps and coolants which have been collected by this inclined surface 123 and 123 are collected in a collecting tank 124 which is withdrawably provided in the base 122.

[Explanation of Another Embodiment of NC Lathe]

The configuration of the NC lathe is not limited to that mentioned above.

Figure 5:
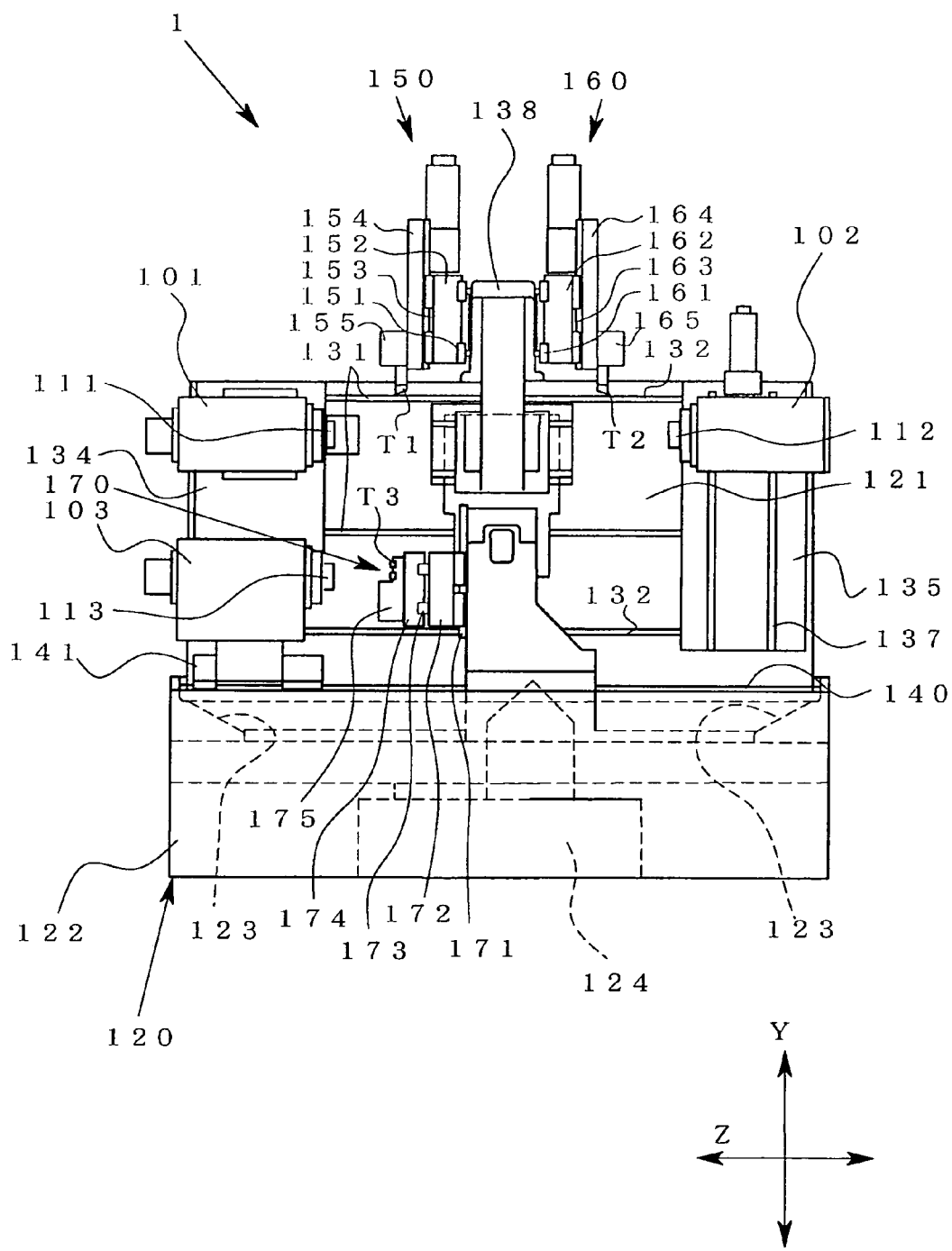
FIG. 5 is a front view of another embodiment of the tri-axial NC lathe constituting the work machining system.
Figure 6:
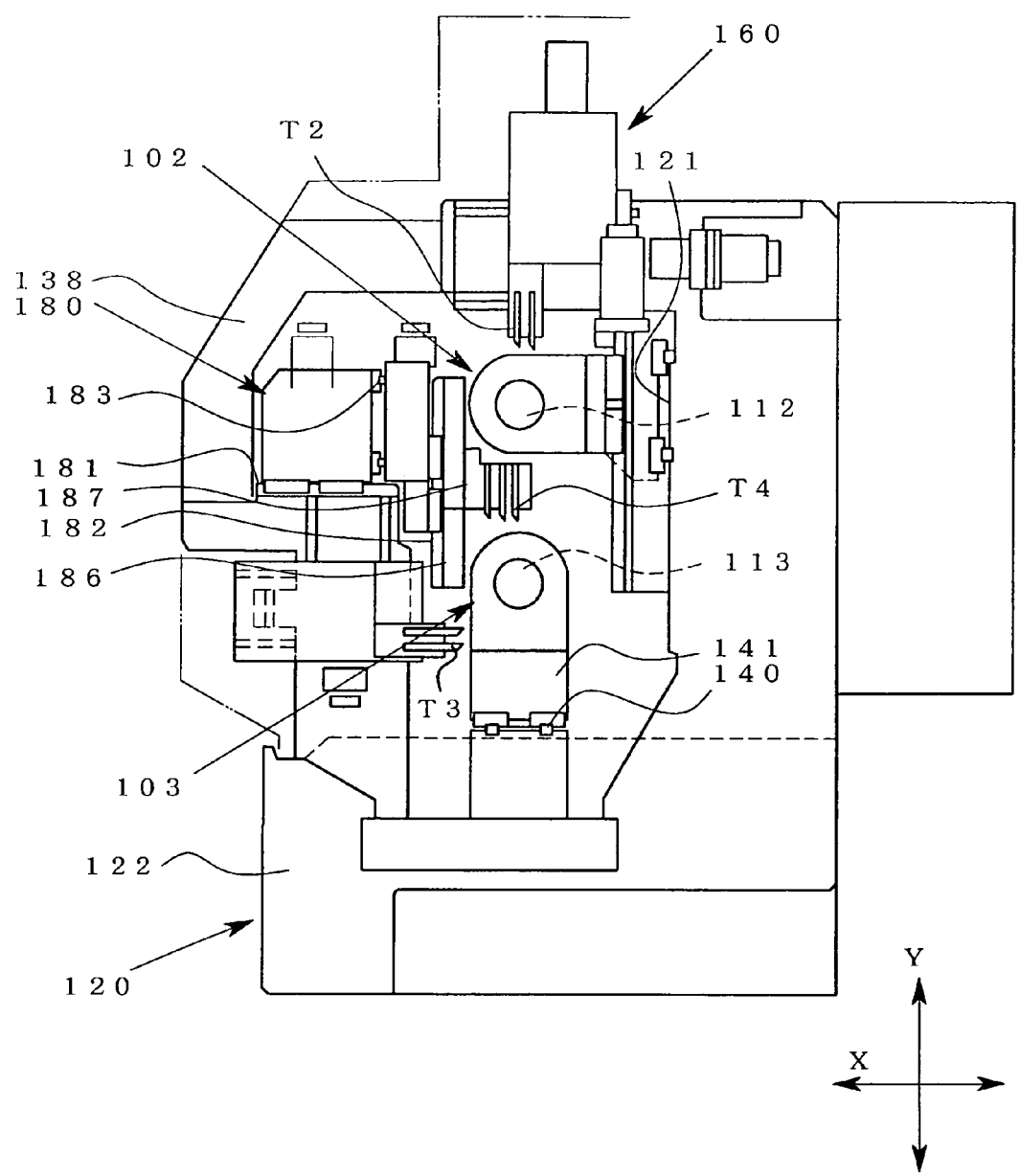
FIG. 6 is a right front view of the NC lathe shown in FIG. 5.

With reference to FIGS. 5 and 6, another embodiment of an NC lathe to which the control program of the invention can be applied will be explained hereinbelow.

In the following explanation, only parts and members different from those in the NC lathe 1 in the first embodiment are explained. The same parts and members are indicated by the same reference numerals, and a detailed explanation thereof is omitted. In this embodiment, as for another tri-axial NC lathe provided adjacently to the NC lathe 1, since it has the same configuration as that of the NC lathe 1 except for the arrangement of each constituting members which is line symmetrical with that of the NC lathe 1, and hence, a detailed explanation is omitted.

In this embodiment, on the ZX surface of the base 122, a guiderail 140 is laid in the Z direction. The third headstock 103 is provided on a saddle 141 which moves back and forth in the Z direction by the guidance of the guiderail 140.

This configuration has an advantage that the provision of the concave part 136(a) in the saddle 141 (see FIG. 4) to avoid the interference of the third headstock 103 with the saddle 137 and the second headstock 102 is not necessary unlike the above-mentioned embodiment.

[Explanation of Control]

Figure 7:
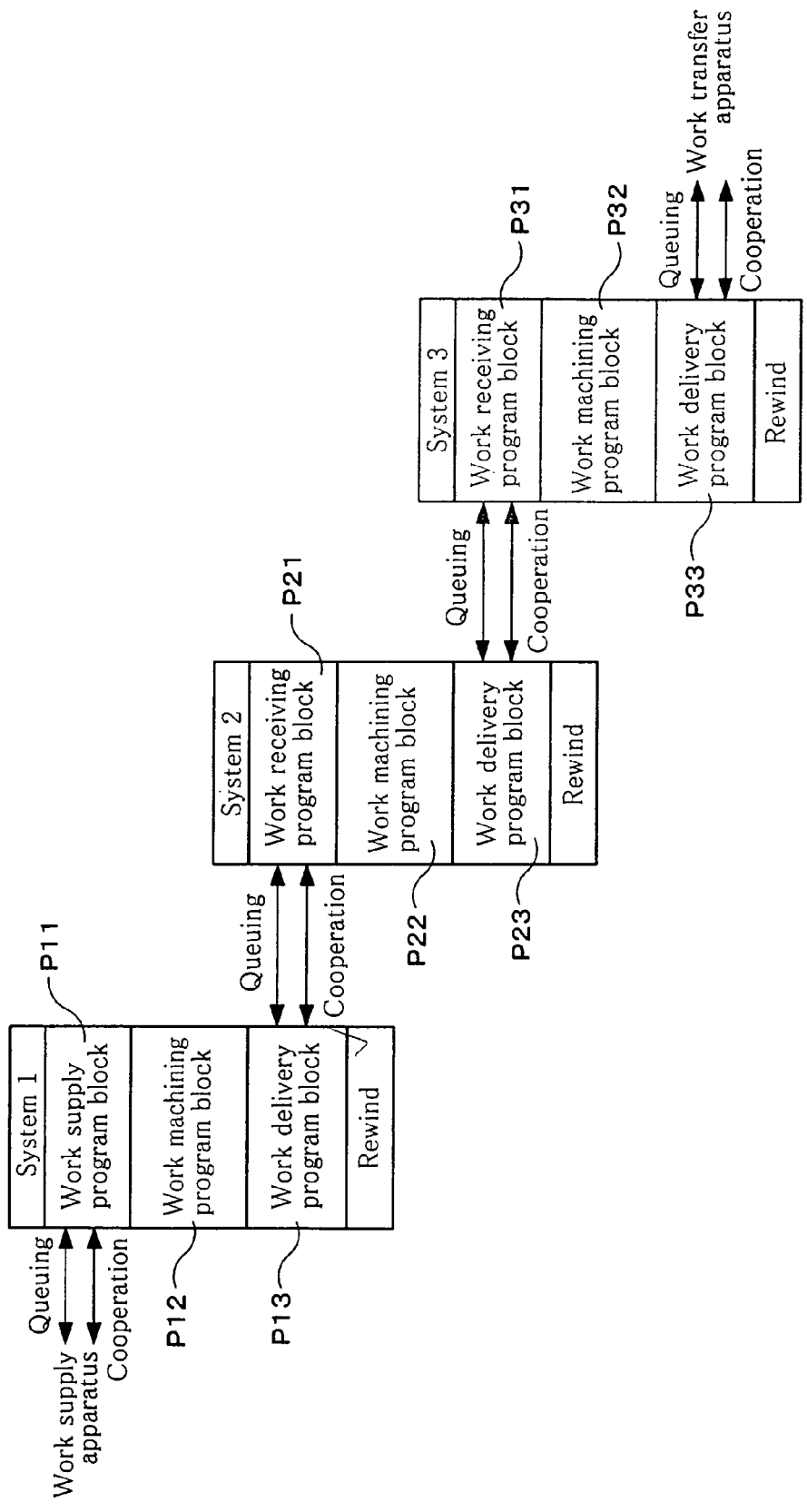
FIG. 7 is a block view showing the configuration of one example of the control program of the invention.

Next, configuration of the control program which controls the movement of each of the headstocks 101 to 103, each of the tool rests 150 to 180 and each of the movable parts of the NC lathe, as well as the rotation or the like of the main spindles 111 to 113 of the NC lathe 1 having the above-mentioned configuration will be mentioned with reference to FIG. 7.

As shown in FIG. 7, three independent control systems (control programs) corresponding to the main spindles 111 to 113 are introduced to the control device of the NC lathe 1.

The control system of the first main spindle 111 (hereinafter referred to as the "system 1") has a work supply program block P11 for supplying the work W from the bar feeder 2 to the first main spindle 111, a work machining program block P12 for machining the work W by the relative movement of the tool T1 mounted on the first tool rest 150 with the first main spindle 111, and a work delivery block program P13 for delivering the work W which has machined by the tool T1 to the second main spindle 112.

The work supply program block P11, the work machining program block P12 and the work delivery program block P13 each consists of an independent program. On the condition that the program of the work supply program block P11 ends, the program of the work machining program block P12 starts. On the condition that the program of the work machining program block P12 ends, the program of the work delivery program block P13 starts.

By executing these programs sequentially, machining of the work W which has been supplied from the bar feeder 2 is performed, and the work W which has been machined is then delivered to the second main spindle 112.

The work supply program block P11 is linked with the work supply program in the bar feeder 2 (see FIG. 1), and work receiving action of the first main spindle 111 starts after waiting (queuing) until the bar feeder 2 is prepared for delivering a work (cooperation).

The control system of the second main spindle 112 (hereinafter referred to as "system 2") has a work receiving program block P21 for receiving the work W from the first main spindle 111 and held by the chuck at its end, a work machining program block P22 for machining the work W by the relative movement of the tool T2 mounted on the second tool rest 160 and/or the tool T4 mounted on the third tool rest 180 with the second main spindle 112, and a work delivery block program P23 for delivering the work W which has been machined by the tool T2 and/or the tool T4 to the second main spindle 112.

In this system 2, the program of each of the work supply program block P21, the work machining program block P22 and the work delivery program block P23 is an independent program. On the condition that the program of the work supply program block P21 ends, the program of the work machining program block P22 starts. On the condition that the program of the work machining program block P22 ends, the program of the work machining program block P23 starts.

By executing these programs sequentially, the work W is received from the first main spindle 111, the work W which has been received is machined, and the work W which has been machined is then delivered to the third main spindle 113. The work receiving program block P21 is linked with the work delivery program P13 in the system 1, and the work receiving action of the second main spindle 112 starts after waiting (queuing) until the first main spindle 111 is prepared for delivering a work (cooperation).

The control system of the third main spindle 113 (hereinafter referred to as the "system 3") has a work supply program block P31 for receiving the work W from the second main spindle 112 and holding it by the chuck at its end, a work machining program block P32 for machining the work W by the relative movement of the tool T3 mounted on the third tool rest 170 and/or the tool T4 mounted on the fourth tool rest 180 with the third main spindle 113, and a work delivery block program P33 for discharging the work W which has been machined by the tool T3 and/or the tool T4 outside the apparatus.

In this system 3, the program of each of the work receiving program block P31, the work machining program block P32 and the work delivery program block P33 is an independent program. On the condition that the program of the work receiving program block P31 ends, the program of the work machining program block P32 starts. On the condition that the program of the work machining program block P32 ends, the program of the work delivery program block P33 starts.

By executing these programs sequentially, the work W is received from the second main spindle 112, the work W which has been received is machined, and the work W which has been machined is then delivered to a work transfer apparatus 5 such as a loader. The work receiving program block P31 is linked with the work delivery program P23 in the system 2, and the work receiving action of the third main spindle 113 is started after waiting (queuing) until the second main spindle 112 is prepared for receiving the work (cooperation).

The work delivery program block P33 is linked with the work delivery program in the work transfer apparatus 5 (see FIG. 1), and the work receiving action of the third main spindle 113 starts after waiting (queuing) until the work transfer by the work transfer apparatus 5 is prepared for receiving a work (cooperation).

Figure 8:
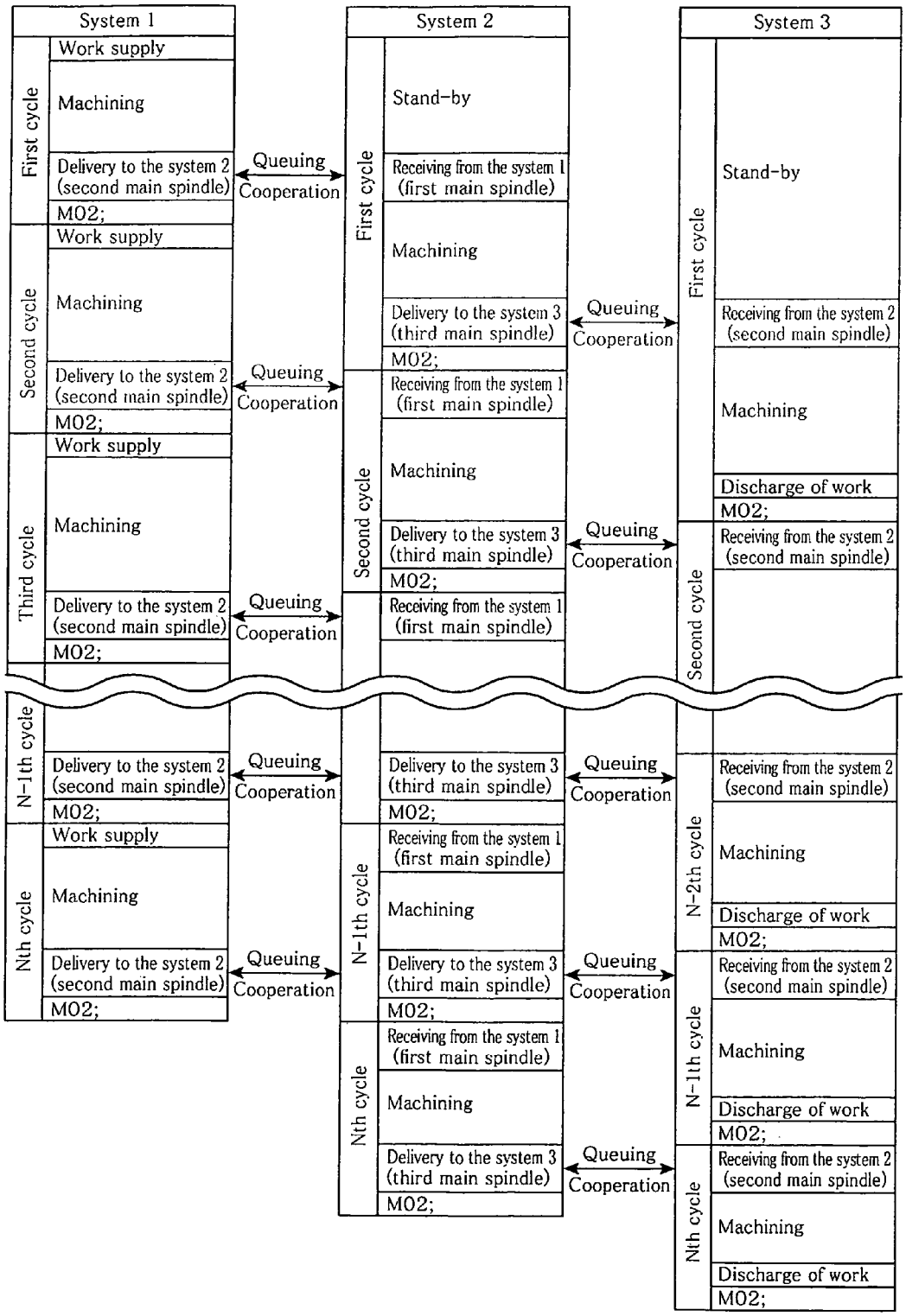
FIG. 8 is a schematic view showing a flow of the control program when a plurality of works are machined.

In addition, at the end of each program 1, 2 and 3, the rewinding program is provided such that a cue of the head of the program in each system can be performed. As examples of a command for rewinding, M02 or the like can be given. As shown in FIG. 8, whenever receiving, machining and discharging of a work W are completed, a cue of the head of the program is performed by rewinding, whereby execution of the program is repeated for each work W.

[One Embodiment of Processing Procedures by Control Program]

Figure 9:
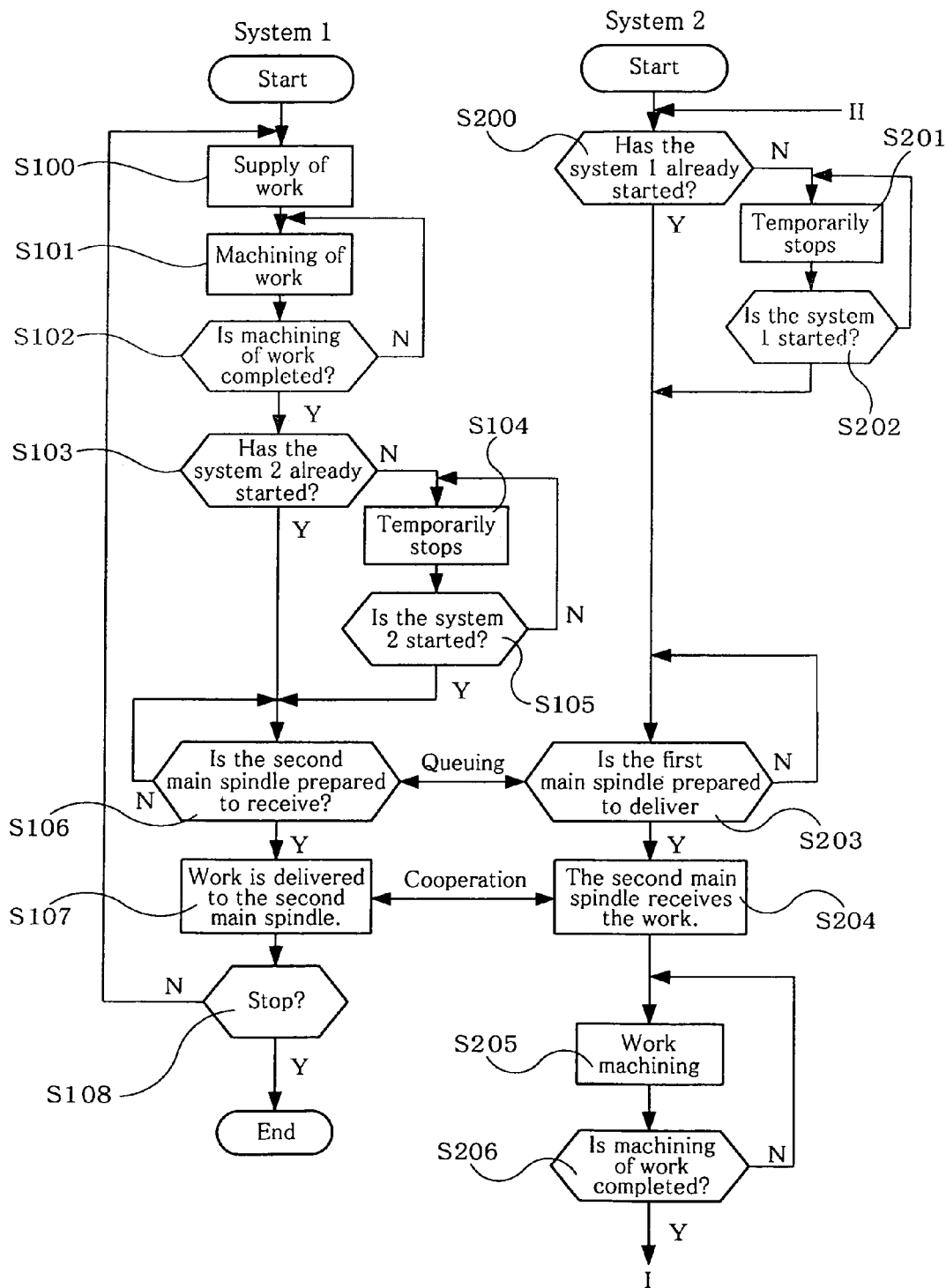
FIG. 9 is a flow chart for explaining the operation procedure by the control program.
Figure 10:
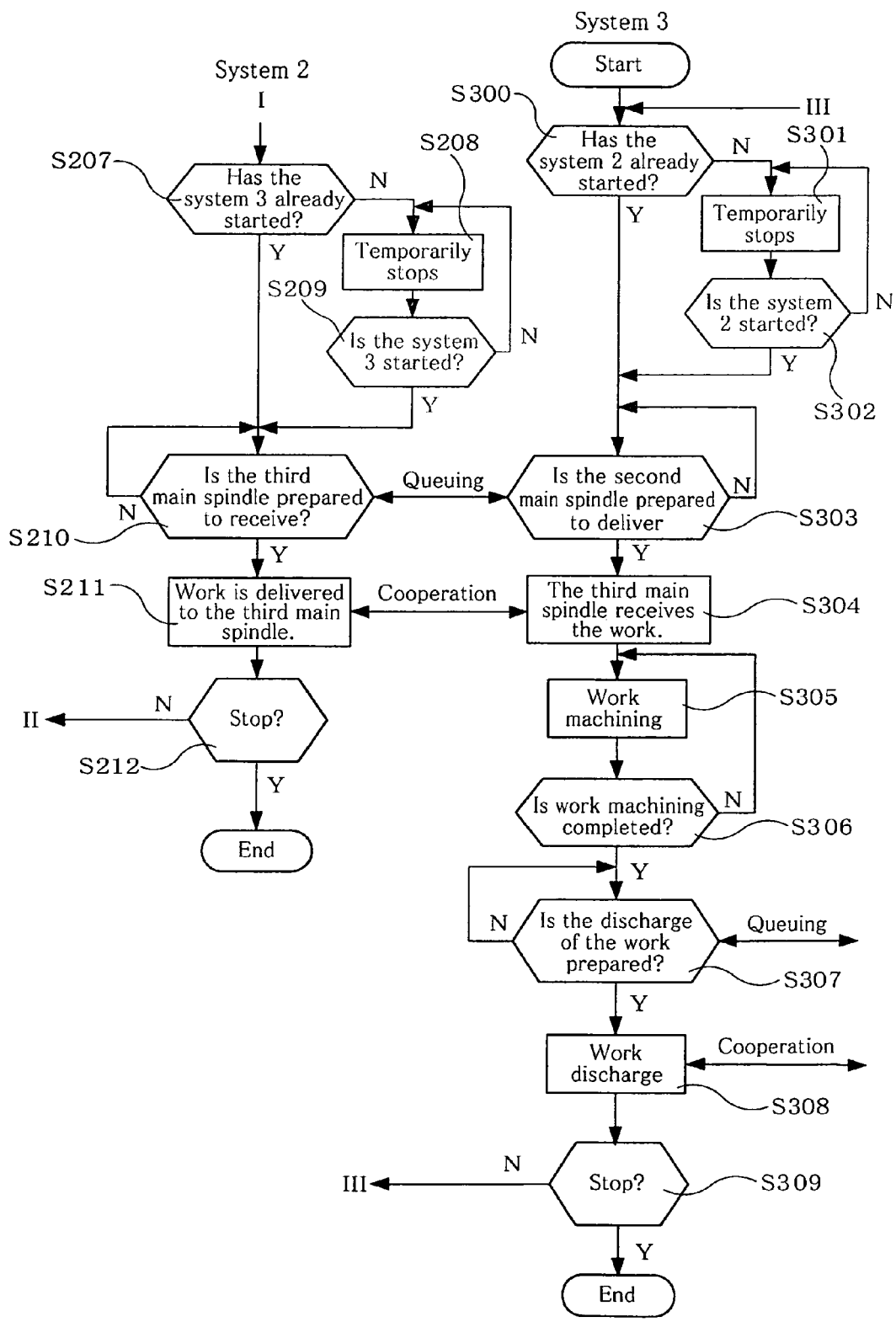
FIG. 10 is a flow chart for explaining the operation procedure by the control program.

FIGS. 9 and 10 each show a flow chart for explaining the operation procedures by the above-mentioned control program. FIGS. 12 to 15 are views showing the operation of the work processing system in each step of this flow chart.

The above-mentioned control program is installed in a single control device provided in the NC lathe. The above-mentioned control device executes the control program which has been installed, and issues various control commands for transfer of the headstocks, rotation of the main spindles, transfer of the tool rests, or the like.

Figure 11:
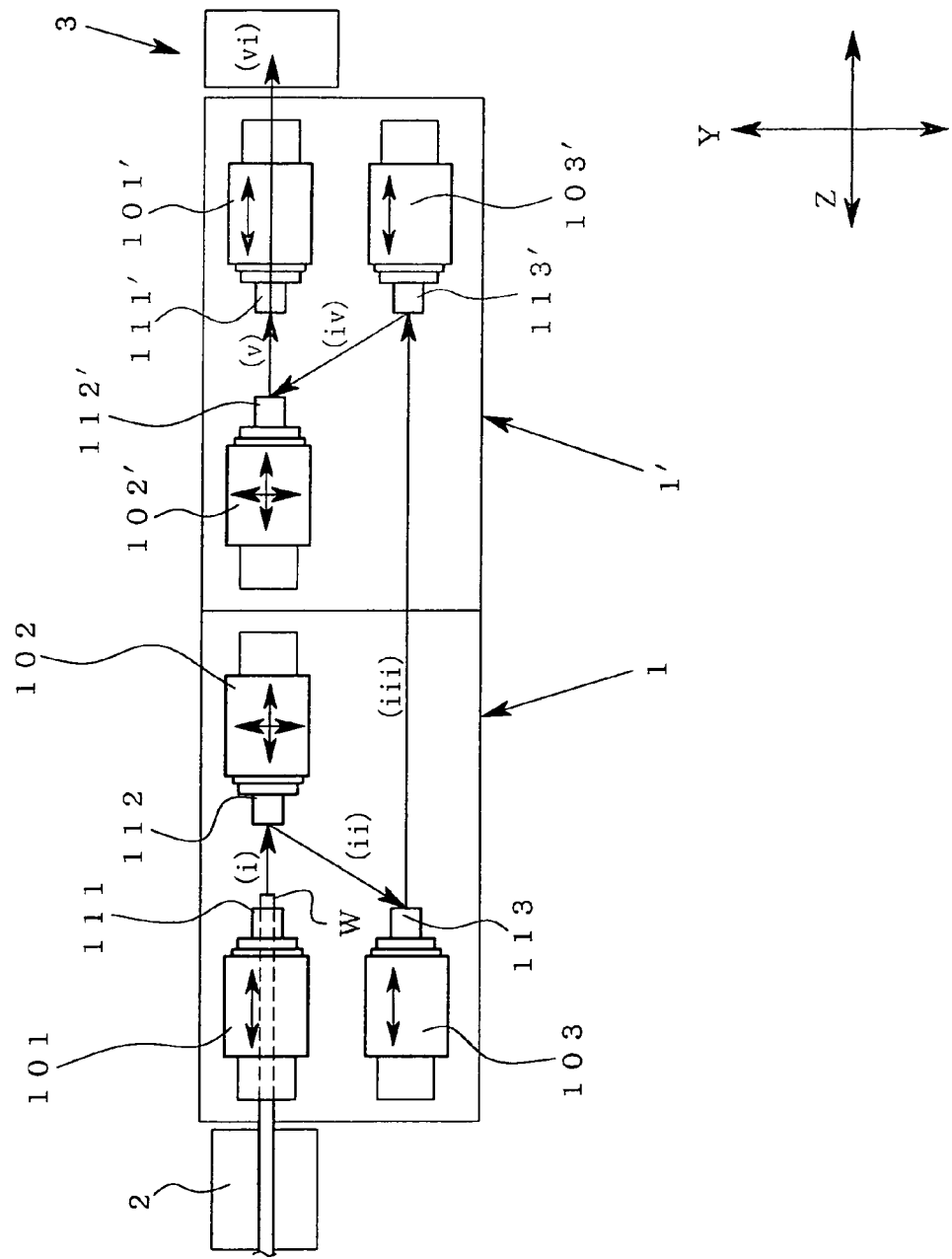
FIG. 11 is a schematic view showing the work machining system formed by combining two NC lathes.

The following explanation is made taking as an example the work machining system shown in FIG. 11 in which two NC lathes are provided side by side. This work processing system is formed of the above-mentioned NC lathe 1 and the other NC lathe 1'. In the NC lathe 1', the first headstock 101, the second headstock 102, the third headstock 103 or the like are arranged line symmetrically with the first headstock, the second headstock, the third headstock or the like of the above-mentioned NC lathe 1 with respect to the Y axis [indicated by putting (') marks on each part].

In one of the NC lathes (shown on the left of the figure), i.e. the NC lathe 1, the work W is machined in the order of (i) and (ii) (see FIG. 11). Thereafter, as shown by (iii), the work W is delivered from the third main spindle 113 to the third main spindle 113' of the other lathe 1' (shown on the right of the figure). In the other lathe 1', the work W is machined while being delivered in the order of (iv) and (v) from the third main spindle 113' to the second main spindle 112' and the first main spindle 111'. In (vi), the work W which has been machined is discharged outside by means of a work transfer apparatus 3 such as a loader.

In the other lathe 1', in which the first main spindle 111', the second main spindle 112' and the third main spindle 113' are line symmetrically arranged with respect to the first main spindle 111, the second main spindle 112 and the third main spindle 113 in the lathe 1, the third main spindle 113' constitutes the "first main spindle", the second main spindle 112' constitutes the "second main spindle" and the first main spindle 111' constitutes the "third main spindle".

In this work machining system, the third main spindle 113 of the NC lathe 1 functions as the work supply apparatus in the other NC lathe 1'. The third main spindle 113' of the other NC lathe 1' functions as the work discharge apparatus of the third main spindle 113 of the NC lathe 1.

Simultaneously with the start of the NC lathes 1 and 1' the work supply program is executed (Step S100). Due to the execution of this program, a bar-like work W is sent from the bar feeder 2 to the through-hole of the first main spindle 111.

Figure 12:
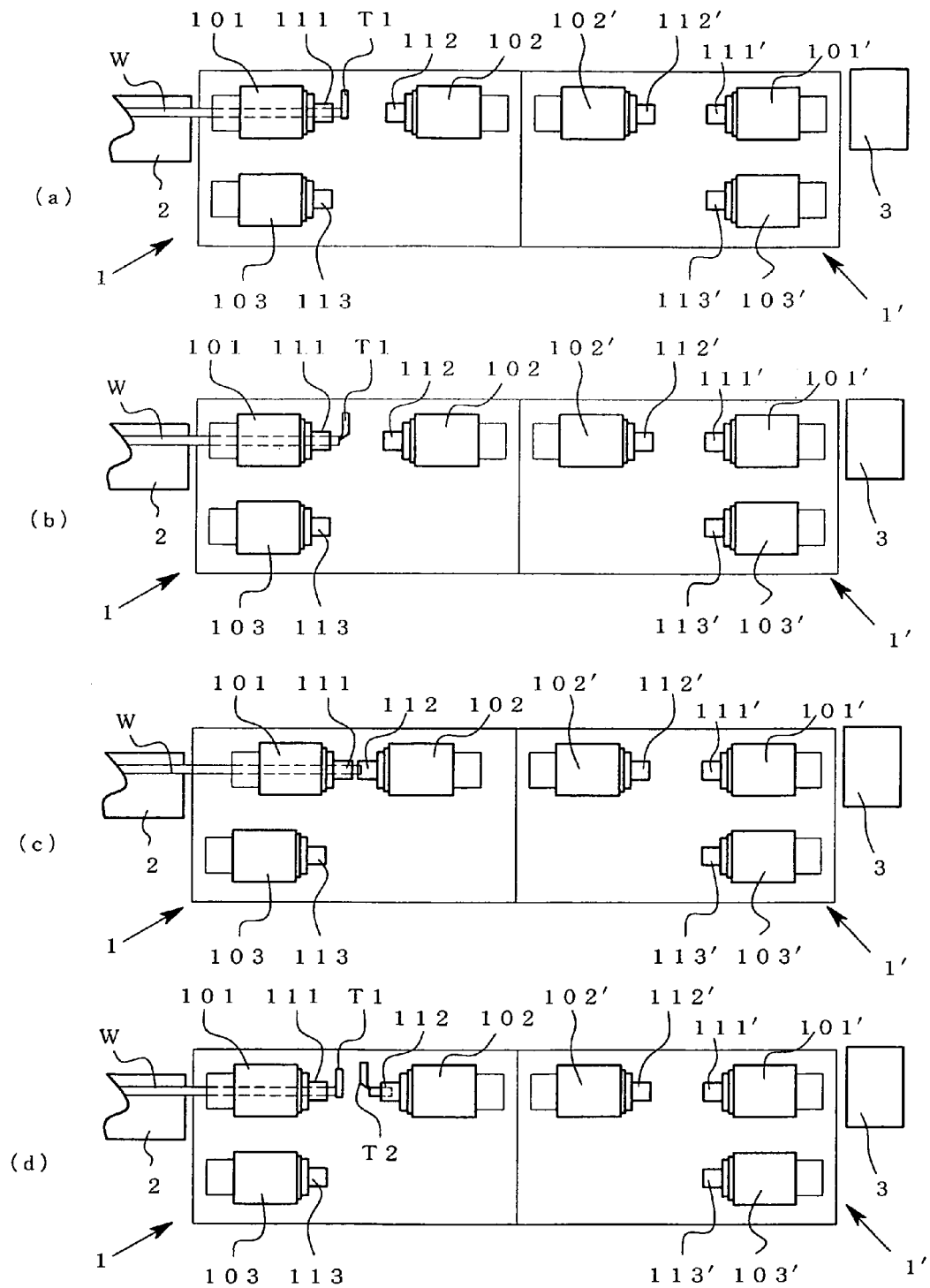
FIG. 12 is a view showing the action of the work machining system in each step of the flow charts shown in FIG. 9 and FIG. 10.

Prior to this, the tool rest body 154 of the first tool rest 150 moves in the X direction, and the tool T1 for positioning is allocated to the machining position. Then, the tool T1 for positioning is positioned at a predetermined position in front of the first main spindle 111. As shown in FIG. 12(*a*), the bar-like work W which has been sent from the bar feeder 2 via the through hole of the first main spindle 111 is projected from the front end of the first main spindle 111 and is abutted with the tool T1 for positioning, whereby positioning is performed. After the completion of the positioning, the chuck provided at the front end of the first main spindle 111 is closed to hold the work W, whereby the work supply program is completed.

Subsequently, the work machining program is executed (Step S101).

Due to the execution of this program, as shown in FIG. 12(*b*), the tool T1 for machining the work W is allocated to the machining position. Machining of the work W is performed by the movement of this tool T1 in the Y direction and the movement of the first main spindle 111 in the Z direction.

After the completion of the machining of the work W by the tool T1 (Step S102), the work machining program ends, and the work delivery program is then executed. Due to the execution of this program, whether the system 2 has started or not yet is judged (Step S103). If the system 2 has not started yet, the program temporarily stops, and remains in the stand-by state until the system 2 starts (Steps S104 and S105).

If the system 2 has started, according to the command of the work delivery program, queuing with the system 2 is performed (Step S106).

After completion of the queuing (after preparation for work receiving is completed), the first headstock 101 is allowed to move, together with the second headstock 102, in the direction in which they get closer to each other, in the common Z-axis direction. As shown in FIG. 12(*c*), at a position which is almost halfway between the headstock 101 and the headstock 102, the work W is delivered from the first main spindle 111 to the second main spindle 112 (Step S107). The first headstock 101 returns to its initial position where a work W for a next machining is received from the bar feeder 2.

Then, the program judges whether or not machining of a predetermined number of work W is completed (Step S108). If completed, the program ends. If not completed, as shown in FIG. 12(d), the program returns to the Step S100 to execute the work supply program. As shown in FIG. 12(d), a work W to be machined next, which has been supplied from the bar feeder 2, is received.

Thereafter, the procedure and operation of the Step S101 and subsequent steps are repeated.

In the system 2, simultaneously with its start (start-up), the work receiving program is executed, and judgment is performed to examine whether the system 1, with which transfer of the work W is conducted, has started normally (Step S200).

When the system 1 has not started normally, for example, due to occurrence of an abnormality such as breakage of tools, unsuccessful work supply and erroneous program execution, the system 2 temporarily stops and remains in the standby state until the system 1 is recovered to its normal start-up state (Steps S201 and S202).

If the system 1 has started normally, queuing is performed until the first main spindle 111 is prepared for delivering a work W (Step S203). After completion of the queuing, as shown in FIG. 12(c), the second headstock 102 is allowed to move in the direction in which the second headstock 102 gets closer to the first headstock 101. At a position which is almost halfway between the two headstocks, i.e. the first headstock 101 and the second headstock 102, the work W is received from the first main spindle 111 to the second main spindle 112 (Step S204).

Although not shown, according to a command of the work receiving program of the system 2, prior to the delivery of the work W from the first main spindle 111 to the second main spindle 112, the cut-off tool T2 on the second tool rest 160 is allocated to the machining position. Then, while allowing the second main spindle 112 to be rotated in the same direction at a speed synchronized with the rotational speed of the first main spindle 111, cutting off of the work W is performed by means of the cut-off tool T2. The work which has been machined at the first main spindle 111 is separated from a bar material. Thereafter, the second main spindle 102 returns to its initial position where machining of the work W is performed, whereby the delivery of the work W from the first main spindle 111 to the second main spindle 112 is completed. Then, the work machining program is executed (Step S205).

In this embodiment, since the control programs of the system 1, the system 2 and the system 3 are independent from each other, even if an abnormality such as breakage of tools, unsuccessful work supply and erroneous program execution occur in the system 1 or the system 3 after the work W is delivered from the first main spindle 111 to the second main spindle 112, for example, the operations of the Step S205 and the subsequent steps in the system 2 are executed.

Due to the execution of the work machining program, the tool T2 and/or the tool T4 for machining the work W is allocated to the machining position. Then, as shown in FIG. 12(d), machining of the work W is performed by the movement in the Y direction of the tool T2 and/or the tool T4 and the movement in the Z direction of the second main spindle 112.

When machining of the work W by the tool T2 and/or the tool T4 is completed (Step S206), the work delivery program is executed, and whether the system 3 has started normally or not yet is judged first (Step S207). If the system 3 has not started normally due to occurrence of an abnormality or the like, the system 2 temporarily stops and remains in the standby mode until the system 3 is recovered to its normal start-up state (Steps S208 and S209).

If the system 3 has started normally, queuing is performed until the third main spindle 113 is prepared for receiving a work (Step S210).

After the completion of the queuing, as shown in FIG. 13(a), the second headstock 102 is moved in the Y direction and the Z direction, i.e. in a direction in which the second headstock 102 gets closer to the third headstock 103 in the common Z direction. Then, the work W is delivered from the second main spindle 112 to the third main spindle 113 (Step S211). As explained above, since the control programs of the system 1, the system 2 and the system 3 are independent from each other, even if an abnormality or the like occurs in either or both of the system 3 and the system 1 after the work W is delivered from the second main spindle 112 to the third main spindle 113, the operations of the Step S211 and subsequent steps in the system 2 are executed. Specifically, after the work W is delivered from the second main spindle 112 to the third main spindle 113 in the Step S211, the second headstock 102 returns to its initial position as shown in FIG. 13(b). Then, the program judges whether the machining of a predetermined number of works W is completed or not (Step S212). If completed, the work delivery program ends. If not completed, the program returns to the step S200 to execute the work receiving program, and queuing with the first main spindle 111 is performed (Step S203). As shown in FIG. 13(c), the work W is received from the first main spindle 111 (Step S204).

Thereafter, the procedure and operation of the Step S205 and subsequent steps are repeated.

In the system 3, simultaneously with its start (start-up), the work receiving program is executed, and judgment is performed to examine whether the system 2, with which transfer of the work W is conducted, has started normally (Step S300).

When the system 2 has started normally, due to occurrence of an abnormality, for example, the system 3 temporarily stops and remains in the standby state until the system 2 recovers to its normal start-up state (Steps S301 and S302).

If the system 2 has started normally, queuing is performed until the second main spindle 112 is prepared for delivering a work W (Step S303). When the second main spindle is prepared for delivering, as shown in FIG. 13(a), the second headstock 102 is allowed to move in the direction in which the second headstock 102 gets closer to the third headstock 103 in the Z axis direction. At a position which is almost middle of the two headstocks, i.e. the second headstock 102 and the third headstock 103, the work W is received from the second main spindle 112 to the third main spindle 113 (Step S304), and the second headstock 102 returns to its initial position for machining the work W.

As explained above, since the control programs of the system 1, the system 2 and the system 3 are independent from each other, even if an abnormality or the like occurs in either or both of the system 1 and the system 2 after the work W is delivered from the second main spindle 112 to the third main spindle 113 in the Step S304, the operations of the Step S305 and subsequent steps in the system 3 are executed.

The delivery of the work W from the second main spindle 112 to the third main spindle 113 is completed by the above-mentioned operations. Then, the work machining program is executed (Step S305). Due to the execution of this program, the tool T3 and/or the tool T4 for machining the work W are allocated to the machining position, and as shown in FIG. 13(b) and FIG. 13(c), machining of the work W is performed by the movement of the tool T3 and/or the tool T4 in the Y direction and the movement of the third main spindle 113 in the Z direction.

Figure 13:
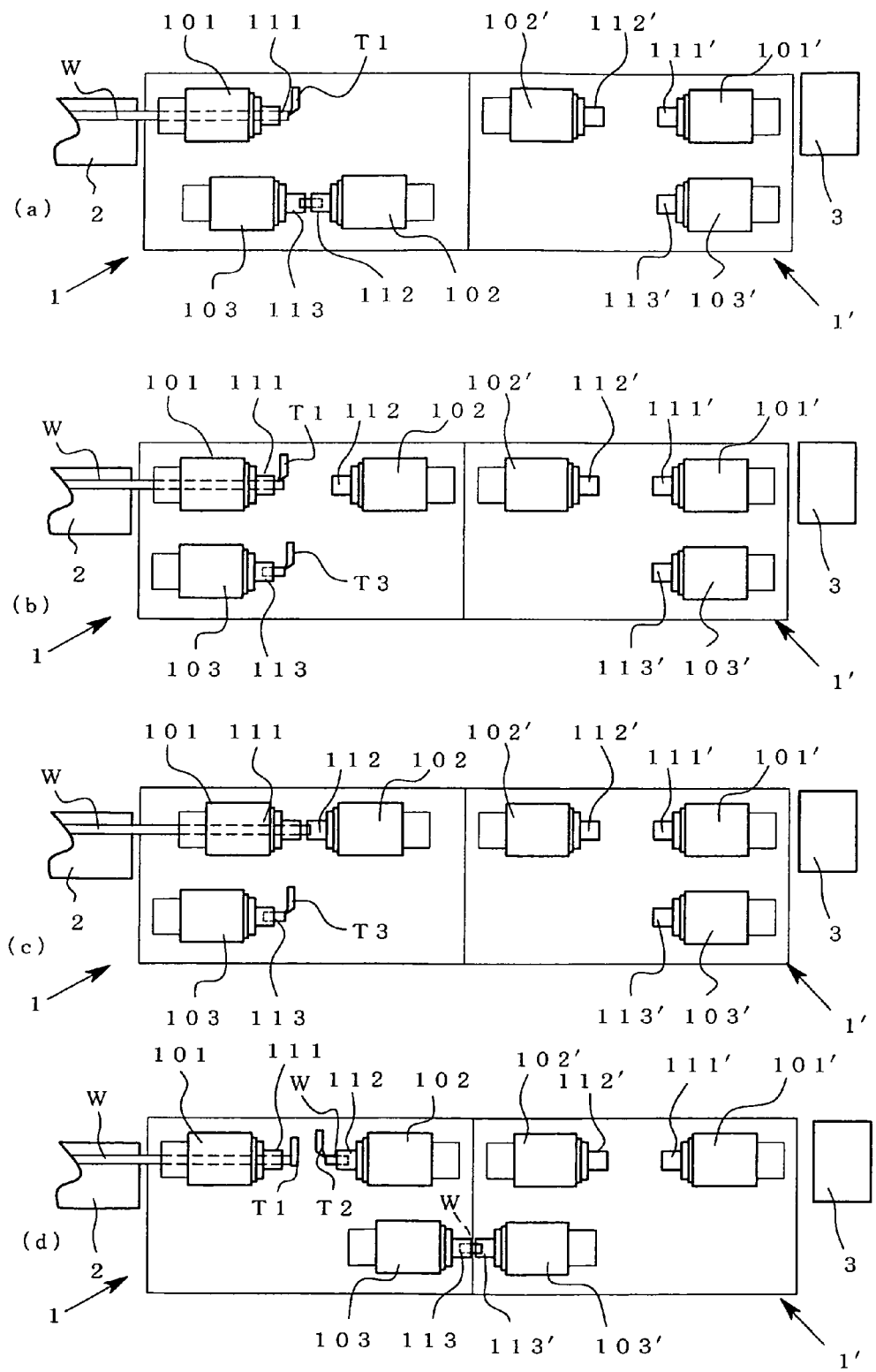
FIG. 13 is a view showing the action of the work machining system in each step of the flow charts shown in FIG. 9 and FIG. 10.

After completion of machining of the work W by the tool T3 and/or the tool T4 (Step S306), the work discharge program is executed and queuing with the third main spindle 113' of the other NC lathe 1' is performed (Step S307). After completion of the queuing, as shown in FIG. 13(*d*), the third main spindle 103 is moved in the direction in which the third main spindle 103 gets closer to the third main spindle 113' of the other NC lathe 1' in the Z axis direction, and the work W is delivered from the third main spindle 113 to the third main spindle 113' of the other NC lathe 1' (Step S308).

Figure 14:
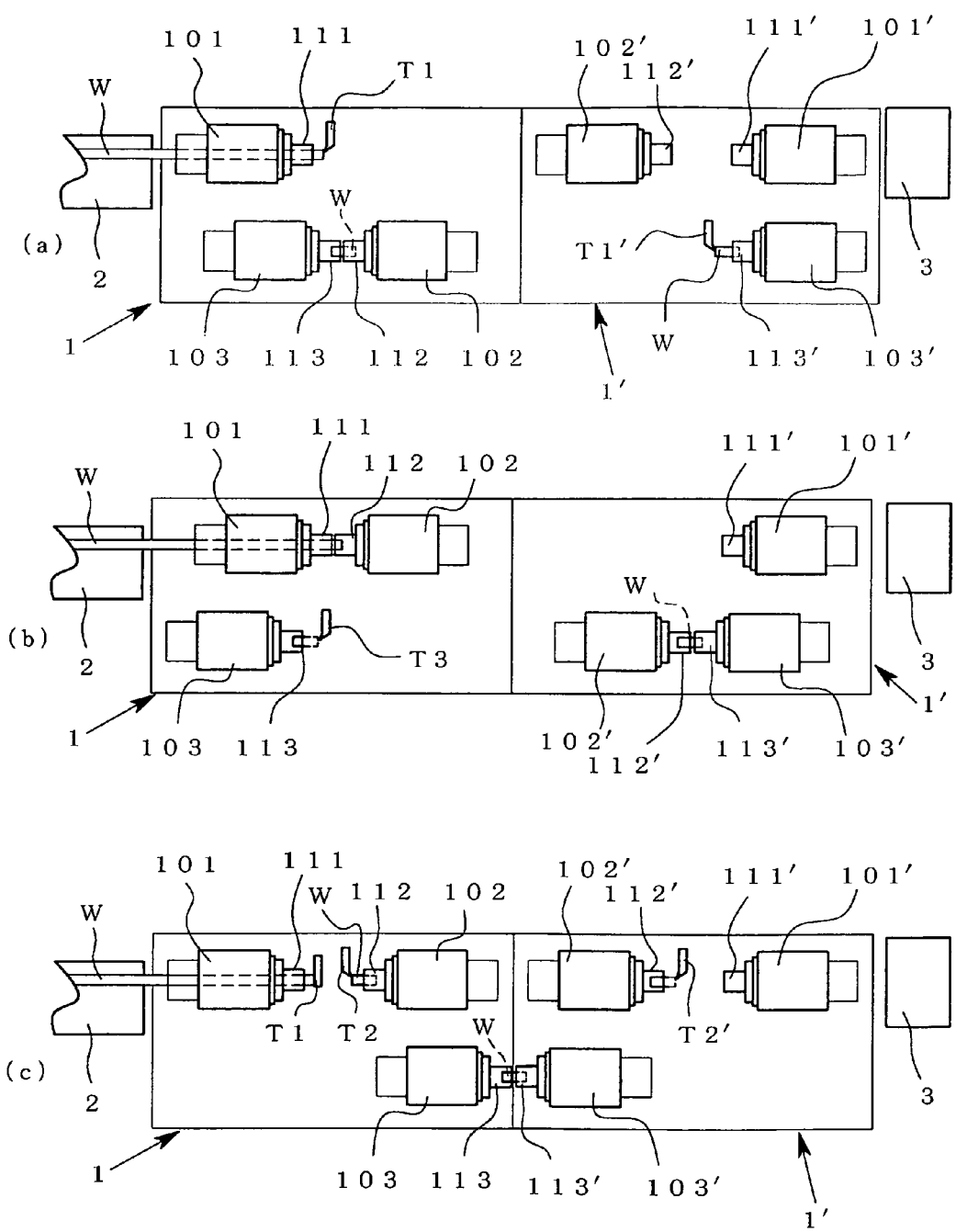
FIG. 14 is a view showing the action of the work machining system in each step of the flow charts shown in FIGS. 9 and 10.

After completion of the delivery of the work W, the third headstock 103 returns to its initial position for machining the work W. Then, judgment is performed to examine whether machining of a predetermined number of work W is completed (Step 309). If completed, the program ends. If not completed, the program returns to the Step S300 to execute the work receiving program, and queuing with the second main spindle 112 is performed (Step S303). As shown in FIG. 14(*a*), the work W is received from the second main spindle 112 (Step S304).

Thereafter, the procedure and operation of the Step S304 and subsequent steps are repeated.

In the other NC lathe 1', the same procedure and operation as mentioned above are repeated.

In the NC lathe 1', however, the work W is delivered in the order of the third main spindle 113', the second main spindle 112' and the first main spindle 111'.

In the third main spindle 113', the work W is received from the third main spindle 113 of the NC lathe 1. Then, after the third main spindle 113' returns to its initial position for machining the work W, the third main spindle 113' performs the operations shown in FIGS. 14(*a*), (*b*) and (*c*) while following the same steps of the Step S101 and subsequent steps in the flow chart in FIG. 9.

Figure 15:
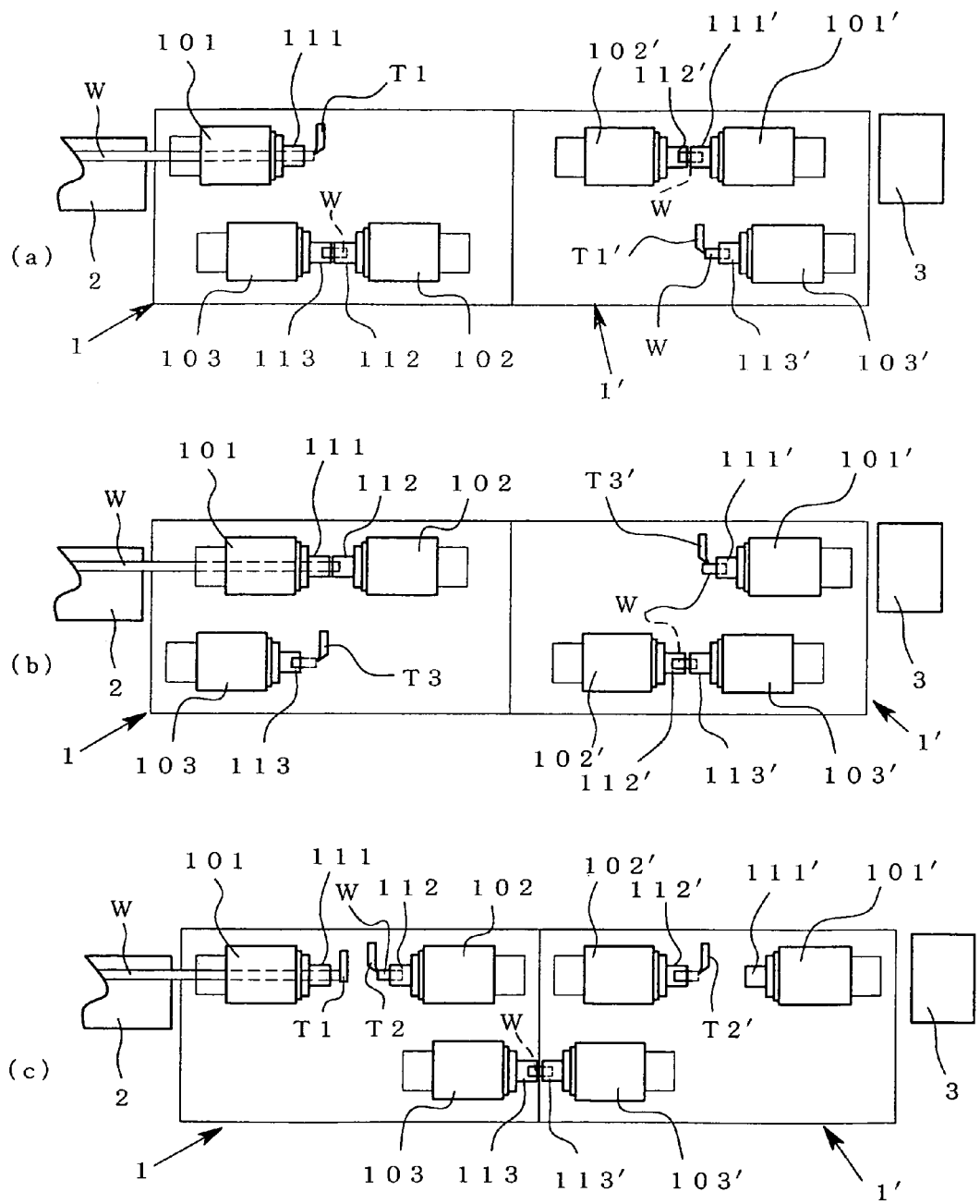
FIG. 15 is a view showing the action of the work machining system in each step of the flow charts shown in FIGS. 9 and 10.

The second main spindle 112' performs the operations shown in FIGS. 14(*b*), (*c*) and FIG. 15(*a*) while following the same steps of the Step S200 and subsequent steps in the flow chart in FIGS. 9 and 10.

The first main spindle 111' performs the operations shown in FIGS. 15(*a*), (*b*) and (*c*) while following the same steps of the Step S300 and subsequent steps in the flow chart in FIG. 10.

In the queuing in the Step S307, the queuing is performed with a loader for work discharge after completion of machining, and the work W is delivered from the first main spindle 111' to a loader in the Step S308.

[Another Embodiment of the Operation Procedure by the Control Program]

In the above-mentioned operation procedure by the control program, since the systems 1, 2 and 3 are independent from each other, even an abnormality such as tool breakage, erroneous work supply and erroneous program execution occurs in other upstream control systems (i.e. the system 1 or the system 2 for the system 3, the system 1 for the system 2), execution of the program continues in other systems where no abnormality occurs.

For example, if an abnormality occurs in the system 1 positioned on the uppermost stream of the work machining, in the systems 2 and 3, machining of the work W and transfer of the work between the systems 2 and 3 are performed as usual. Since the Step S200 in the system 2 (see FIG. 9) judges whether there is an abnormality in the system 1, if an abnormality occurs in the system 1, the system 2 temporarily stops (Step S201), or work delivery from the first main spindle 111 to the second main spindle 112 is disabled in the queuing steps S106 or S203, the second main spindle 112 temporarily stops in this step.

Even though no abnormality occurs in the system 2, if the system 2 temporarily stops for the above-mentioned reason, delivery of the work from the second main spindle 112 to the third main spindle 113 is disabled, and hence, the system 3 temporarily stops in the queuing step S303 (see FIG. 10). An operator can work for the elimination of the abnormality in the system 1 after waiting until the systems 2 and 3 temporarily stop.

Of course, an operator can forcibly stop the execution of the program in the systems 2 and 3 by quickly handling the emergency stop switch or the like when an abnormality occurs in the system 1. If execution of the work machining program is forcibly stopped during the machining of the work W at the second main spindle 112 and the third main spindle 113, the work W may get a scratch during machining or other disadvantages may occur.

Figure 16:
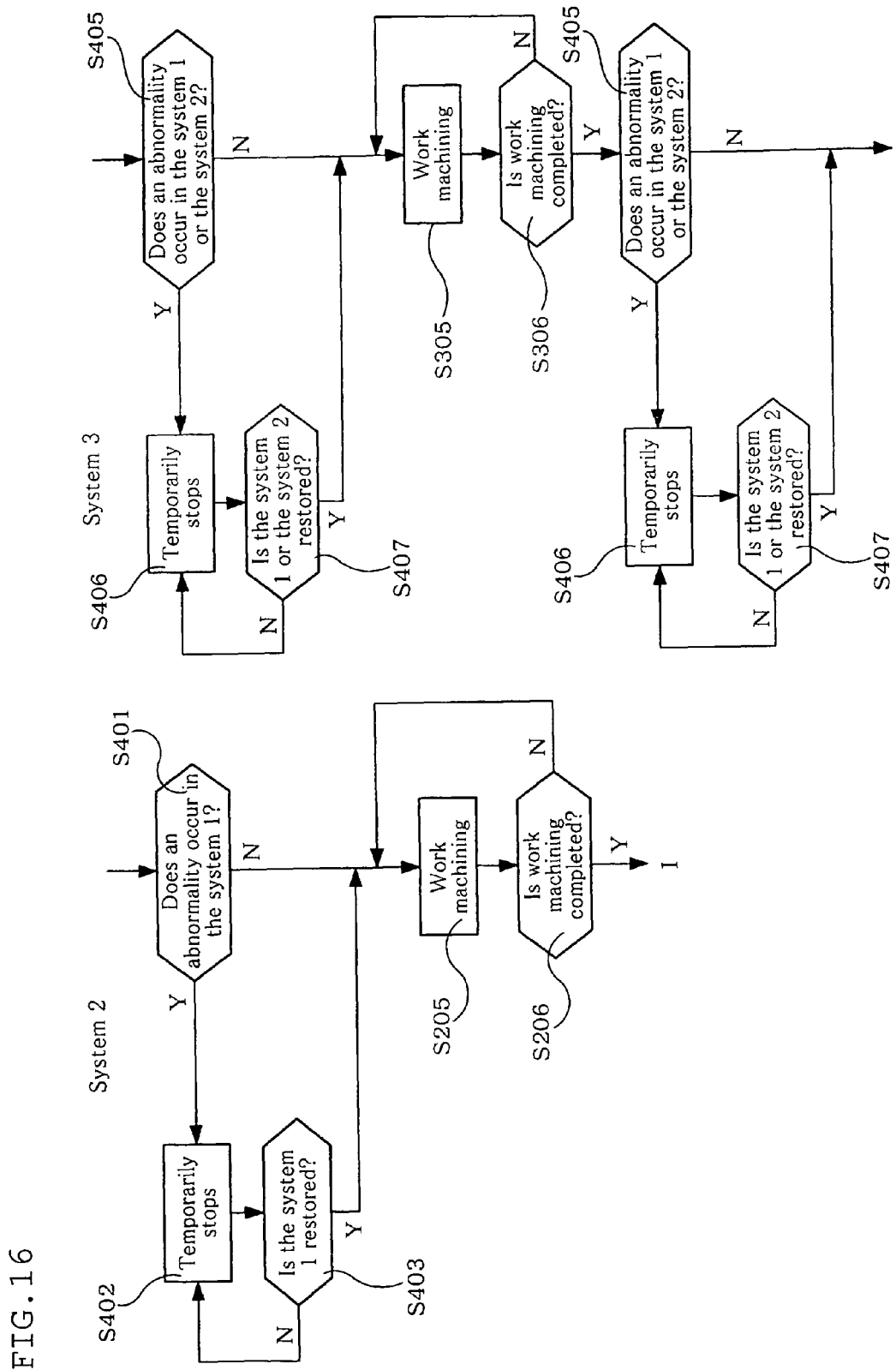
FIG. 16 is an extract of the main part of the flow chart according to another embodiment of the operation procedure by the control program.

In this embodiment, as shown in FIG. 16, program blocks are provided. By these program blocks, if an abnormality occurs in a system positioned on the upstream of each system, the operation temporarily stops before the start or after the completion of machining of the work, whereby elimination of the abnormality can be waited.

The flow chart shown in FIG. 16 is basically the same as the flow charts shown in FIG. 9 and FIG. 10. Therefore, only additional steps are shown, and other steps are not shown and a detailed explanation thereof is also omitted.

As shown in FIG. 16, in the system 2, before the Step S205 which issues a command to machine a work, inserted are program blocks, i.e., Step S401 which judges whether an abnormality occurs in the system 1, Step S402 which issues a command to temporarily stop the program execution if occurrence of an abnormality is confirmed in the Step S401, and Step S403 which retains this temporal suspension state until an abnormality in the system 1 is eliminated.

Due to the provision of these program blocks, after the work W is delivered from the first main spindle 111 to the second main spindle 112, if an abnormality occurs in the system 1 or in the system 2 before the start of machining of the work W in the second main spindle 112, the system 2 temporarily stops without starting machining of the work W. If an abnormality occurs in the system 1 during or after completion of machining of the work W at the second main spindle 112, the system 2 temporarily stops in the Step S201 (see FIG. 9).

In the system 3, before the Step S305 which issues a command to machine the work W and after the Step S306 which judges whether machining of the work is completed, inserted are Step S405 which judges whether an abnormality occurs in the system 1 or the system 2, Step S406 which issues a command to temporarily stop the program execution if occurrence of an abnormality is confirmed in this step S405 and Step S407 which retains this temporal suspension state until an abnormality in the system 1 or the system 2 is eliminated.

Due to the provision of these program blocks, after the work W is delivered from the second main spindle 112 to the third main spindle 113, if an abnormality occurs in the system 1 or in the system 2 before the start of machining of the work W in the third main spindle 113, the system 3 temporarily stops without starting machining of the work W. If an abnormality occurs in the system 1 or the system 2 during machining of the work W at the third main spindle 113, the system 3 temporarily stops after machining of the work W is completed.

When the system 2 and the system 3 temporarily stop, an operator can work for eliminating the abnormality in the system 1. When the abnormality in the system 1 is eliminated, by handling a start switch or the like of the NC lathe 1, execution of the programs of the systems 1, 2 and 3 is simultaneously restarted.

In the example shown in FIG. 16 and in the above-given explanation, a program block (Steps S401, S402, S403 and Steps S405, S406 and S406) to temporarily stop the execution of the program when an abnormality occurs in upstream systems is provided before the Step S205 in the system 2, before the Step S305 in the system 3 and before the Step S306 in the system 3. The reason therefor is as follows. The NC lathe 1 in this embodiment is set such that machining time of the work W is longer in upstream steps. If an abnormality occurs in upstream steps, downstream steps are caused to stop temporarily in a sequential manner, whereby downstream steps can stop temporarily in a timely manner, and the stand-by time in downstream steps during the elimination of the abnormality can be shortened as much as possible.

As mentioned above, it is preferred that this program block be provided such that execution of the program in each system 1, 2 and 3 can temporarily stop in the most timely manner if an abnormality occurs in each of the systems 1, 2 and 3 and that execution of the program of each system 1, 2 and 3 can be started again in the least wasteful state. Therefore, it is preferred that this program block be provided either before the Step S205 or after the Step S206 or both before the Step S205 and after the Step S206, and either before the Step S305 or after the Step 306 or both before the Step S305 and after the Step 306, taking into consideration comprehensively the machining time of the work W, the supply time of the work W, the discharge time of the work W or the like. If necessary, also in the system 1, either before the Step S101 (work machining) or after the Step S102 (judgment of work machining completion), or both before the Step S101 and after the Step S102, a step may be provided to temporarily stop the execution of the program due to an abnormality of the bar feeder 2 which is a work supply apparatus arranged in upstream steps.

The preferred embodiments of the invention are explained hereinabove, which are in no way intended to limit the invention.

For example, the above explanation was made taking as an example the rewind command of an M02 code, which is commonly used in an NC machining apparatus. It is needless to say other codes can be used.

In addition, in the above explanation, the number of works is counted, whether a work to be machined is the last work or not is judged in each program, and the programs end in a sequential manner when the last work is machined. However, the system may be configured such that the program remains in the stand-by state until the work which has been machined at the third main spindle is delivered to a work transfer apparatus and all programs end after completion of this delivery.

Furthermore, the number of the NC lathe constituting the above-mentioned work machining system is not limited to two. The control program of the invention can be applied if the number of the NC lathe is three or more.

In another embodiment of the operation procedure of the above-mentioned control program, if an abnormality occurs in an upstream system of work machining (including a work supply apparatus), execution of a program in downstream systems temporarily stops. However, it is possible to provide a program block such that, if an abnormality occurs in one system, irrespective of its being an upstream system or a downstream system, the abnormality in this system is judged by other systems, and execution of the program in each system temporarily stops in a timely manner.

Industrial Applicability

The invention can be applied to a multi-axial work machining apparatus in which a plurality of machining is conducted sequentially for a single work. In addition to a machining apparatus such as an NC lathe, the invention can also be widely applied to a variety of apparatuses including an assembling machine in which a number of components are assembled to a semi-finished product to obtain a finished product.

The invention claimed is:

1. A non-transitory computer readable recording medium for controlling a work machining apparatus for a work machining machine having a plurality of machining units having a work fixing part and a work machining part configured to perform machining of a work while transferring the work in the plurality of machining units successively, comprising:
a control system provided for each of the machining units to control a movement of the machining unit,
wherein each control system of the machining units has
a work receiving program block executing the machining unit to receive the work for machining,
a work machining program block executing the machining unit to machine the work, and
a work discharging program block executing the machining unit to discharge the work,
wherein each control system repeats receiving the work first and then discharging the work machined after completion of machining of the work, and
wherein, when one machining unit at an upstream side of the machining units discharges the work, the work discharging control unit of the one machining unit at the upstream side and another work receiving control unit of the machining unit at a downstream side cooperate together such that the another machining unit at the downstream side receives the work.

2. The non-transitory computer readable recording medium for controlling a work machining apparatus according to claim 1, wherein the work receiving control unit, the work machining control unit, and the work discharge control unit finish controlling the movement when a number of the work machined reaches a predetermined number.

3. The non-transitory computer readable recording medium for controlling a work machining apparatus according to claim 1, wherein
the work machining machine is an NC lathe,
the NC lathe has a first main spindle, a second main spindle, a third main spindle, a first tool rest, a second tool rest, and a third tool rest,
an axis of the first main spindle and an axis of the second main spindle are arranged in parallel to each other,
the third main spindle is arranged opposing to the first main spindle and the second main spindle such that an axis of the third main spindle is arranged in parallel to the first main spindle and the second pain spindle,
the first main spindle, the second main spindle, and the third main spindle have the first tool rest, the second tool rest, and the third tool rest, respectively, and
each of a pair of the first spindle and the first tool rest, a pair of the second spindle and the second tool rest, and a pair of the third spindle and the third tool rest compose a machining unit respectively.

4. The non-transitory computer readable recording medium for controlling a work machining apparatus according to claim 1, wherein
the work machining apparatus is an NC lathe,
a plurality of the NC lathes forms a work machining system, and
the work discharge program block of the NC lathe at the upstream side of machining and the work receiving program block of the NC lathe at the downstream side of machining control cooperation of the work discharge program block and the work receiving program block.

5. The non-transitory computer readable recording medium for controlling a work machining apparatus according to claim 1, wherein at least one of the control systems stops a start of machining of the work or stops a start of discharging of the work when an abnormality is present on a remaining of the control system other than the at least one of the control systems.

6. The non-transitory computer readable recording medium for controlling a work machining apparatus according to claim 1, wherein, when an abnormality is present on at least one of the control systems, a remaining of control system other than the at least one of the control systems continues machining of the work until queuing between the at least one of the control systems and the remaining of control system other than the at least one of the control systems.

7. A control device for a work machining apparatus, comprising
the non-transitory computer readable recording medium according to claim 1,
wherein the work machining apparatus comprises a movable body having the work fixing part and the work machining part,
the work receiving program block controls a movement of the movable body when an unmachined work is received,
the work machining program block controls the movement of the movable body when a work which has been fixed to the work fixing part is machined in the work machining part,
the work discharge program block controls the movement of the movable body when the work which has been machined is discharged, and
a command to control the movement of the movable body is issued by executing the installed non-transitory computer readable recording medium.

8. A control apparatus for a work machining machine having a plurality of machining units having a work fixing part and a work machining part configured to perform machining of a work while transferring the work in the plurality of machining units successively, comprising:
control systems, each being electrically connected to each of the plurality of machining units to control a movement of each machining unit, individually,
wherein each control system comprises
a work receiving control unit executing the machining unit to receive the work for machining,
a work machining control unit executing the machining unit to machine the work received, and
a work discharge control unit executing the machining unit to discharge the work machined,
wherein each of the control systems repeats receiving the work first and then discharging the work machined after completion of machining of the work, and
wherein, when one machining unit at an upstream side of the machining units discharges the work, the work discharging control unit of the one machining unit at the upstream side and another work receiving control unit of the machining unit at a downstream side cooperate together such that the another machining unit at the downstream side receives the work.

9. The control apparatus for a work machining machine according to claim 8, wherein the work receiving control unit, the work machining control unit, and the work discharge control unit finish controlling the movement when a number of the work machined reaches a predetermined number.

10. The control apparatus for a work machining machine according to claim 9, wherein
the work machining machine is an NC lathe,
the NC lathe has a first main spindle, a second main spindle, a third main spindle, a first tool rest, a second tool rest, and a third tool rest,
an axis of the first main spindle and an axis of the second main spindle are arranged in parallel to each other,
the third main spindle is arranged opposing to the first main spindle and the second main spindle such that an axis of the third main spindle is arranged in parallel to the first main spindle and the second pain spindle,
the first main spindle, the second main spindle, and the third main spindle have the first tool rest, the second tool rest, and the third tool rest, respectively, and
each of a pair of the first spindle and the first tool rest, a pair of the second spindle and the second tool rest, and a pair of the third spindle and the third tool rest compose a machining unit respectively.

11. The control apparatus for a work machining machine according to claim 9, wherein
the work machining machine is an NC lathe,
a plurality of the NC lathe forms a work machining system, and
the work discharge control unit of the NC lathe at the upstream side of machining and the work receiving control unit of the NC lathe at the downstream side of machining control cooperation of the work discharge control unit and the work receiving control unit.

12. The control apparatus for a work machining machine according to claim 9, wherein at least one of the control systems stops a start of machining of the work or stops a start of discharging of the work when an abnormality is present on a remaining of control system other than the at least one of the control systems.

13. The control apparatus for a work machining machine according to claim 9, wherein, when an abnormality is present on at least one of the control systems, a remaining of control system other than the at least one of the control systems continues machining of the work until queuing between the at least one of the control systems and the remaining of control system other than the at least one of the control systems.

14. The control apparatus for a work machining machine according to claim 8, wherein
the work machining machine is an NC lathe,
the NC lathe has a first main spindle, a second main spindle, a third main spindle, a first tool rest, a second tool rest, and a third tool rest,
an axis of the first main spindle and an axis of the second main spindle are arranged in parallel to each other,
the third main spindle is arranged opposing to the first main spindle and the second main spindle such that an axis of the third main spindle is arranged in parallel to the first main spindle and the second pain spindle,
the first main spindle, the second main spindle, and the third main spindle have the first tool rest, the second tool rest, and the third tool rest, respectively, and each of a pair of the first spindle and the first tool rest, a pair of the second spindle and the second tool rest, and a pair of the third spindle and the third tool rest compose a machining unit respectively.

15. The control apparatus for a work machining machine according to claim 8, wherein the work machining machine is an NC lathe, a plurality of the NC lathe forms a work machining system, and the work discharge control unit of the NC lathe at the upstream side of machining and the work receiving control unit of the NC lathe at the downstream side of machining control cooperation of the work discharge control unit and the work receiving control unit.

16. The control apparatus for a work machining machine according to claim 8, wherein at least one of the control systems stops a start of machining of the work or stops a start of discharging of the work when an abnormality is present on a remaining of control system other than the at least one of the control systems.

17. The control apparatus for a work machining machine according to claim 8, wherein, when an abnormality is present on at least one of the control systems, a remaining of control system other than the at least one of the control systems continues machining of the work until queuing between the at least one of the control systems and the remaining of control system other than the at least one of the control systems.

* * * * *

UNITED STATES PATENT AND TRADEMARK OFFICE
CERTIFICATE OF CORRECTION

PATENT NO.        : 8,224,477 B2
APPLICATION NO.   : 12/309610
DATED             : July 17, 2012
INVENTOR(S)       : Hitoshi Matsumoto It is certified that error appears in the above-identified patent and that said Letters Patent is hereby corrected as shown below:

Please change column 16, line 36 to 37, "the work discharging control unit" to --the work discharging program block--.

Please change column 16, line 38, "another work receiving control unit" to --another work receiving program block--.

Please change column 16, line 44, "the work receiving control unit" to --the work receiving program block--.

Please change column 16, line 44 to 45, "the work machining control unit" to --the work machining program block--.

Please change column 16, line 45 to 46, "the work discharge control unit" to --the work discharging program block--.

Signed and Sealed this
Fourth Day of December, 2012

David J. Kappos
*Director of the United States Patent and Trademark Office*